US011216216B2

(12) United States Patent
Dorsel et al.

(10) Patent No.: US 11,216,216 B2
(45) Date of Patent: Jan. 4, 2022

(54) PORTABLE MEMORY DEVICE HAVING MUTUALLY EXCLUSIVE NON-VOLATILE ELECTRONIC DATA STORAGE

(71) Applicant: IPXCL, LLC, Charlotte, NC (US)

(72) Inventors: Evan Michael Dorsel, Charlotte, NC (US); Chad Dustin Tillman, Matthews, NC (US)

(73) Assignee: IPXCL, LLC, Charlotte, NC (US)

( * ) Notice: Subject to any disclaimer, the term of this patent is extended or adjusted under 35 U.S.C. 154(b) by 0 days.

(21) Appl. No.: 16/773,965

(22) Filed: Jan. 27, 2020

(65) Prior Publication Data

US 2020/0241800 A1 Jul. 30, 2020

Related U.S. Application Data

(60) Provisional application No. 62/797,136, filed on Jan. 25, 2019, provisional application No. 62/804,220, filed on Feb. 12, 2019.

(51) Int. Cl.
*G06F 13/00* (2006.01)
*G06F 3/06* (2006.01)
*G06F 13/16* (2006.01)

(52) U.S. Cl.
CPC .......... *G06F 3/0659* (2013.01); *G06F 3/0604* (2013.01); *G06F 3/0679* (2013.01); *G06F 13/1668* (2013.01)

(58) Field of Classification Search
CPC .. G06F 3/0659; G06F 13/1668; G06F 3/0679; G06F 3/0604; G06F 3/0623; G06F 3/0635; G06F 3/0644
See application file for complete search history.

(56) References Cited

U.S. PATENT DOCUMENTS

| | | | | |
|---|---|---|---|---|
| 8,996,837 | B1 * | 3/2015 | Bono | G06F 3/0665 711/170 |
| 9,588,904 | B1 * | 3/2017 | Lercari | G06F 3/0616 |
| 10,642,748 | B1 * | 5/2020 | Lercari | G06F 12/0246 |
| 2008/0201524 | A1 * | 8/2008 | Petrescu | G06F 3/0644 711/114 |
| 2011/0130017 | A1 * | 6/2011 | Chou | G06K 19/07 439/131 |
| 2013/0311708 | A1 * | 11/2013 | Lee | G06F 3/064 711/103 |

* cited by examiner

*Primary Examiner* — Jing-Yih Shyu
(74) *Attorney, Agent, or Firm* — Chad D Tillman; Tillman Wright, PLLC

(57) ABSTRACT

A portable memory device includes an interface enabling communications between the portable memory device and an external device; a group of components arranged to provide a certain non-volatile electronic data storage when coupled to the interface. The coupling is performed based on one or more control signals, or on one or more configurations of one or more physical control elements that are transitionable by hand to different configurations, or both. When the group of components and the interface are coupled, the certain non-volatile electronic data storage is provided for use by an external device through the interface; when the group of components and the interface is not coupled or are decoupled, the certain non-volatile electronic data storage is not provided and instead another non-volatile electronic data storage may be provided or none at all. The portable memory device preferably is a flash memory apparatus and may encompass multiple flash-memory drives.

20 Claims, 15 Drawing Sheets

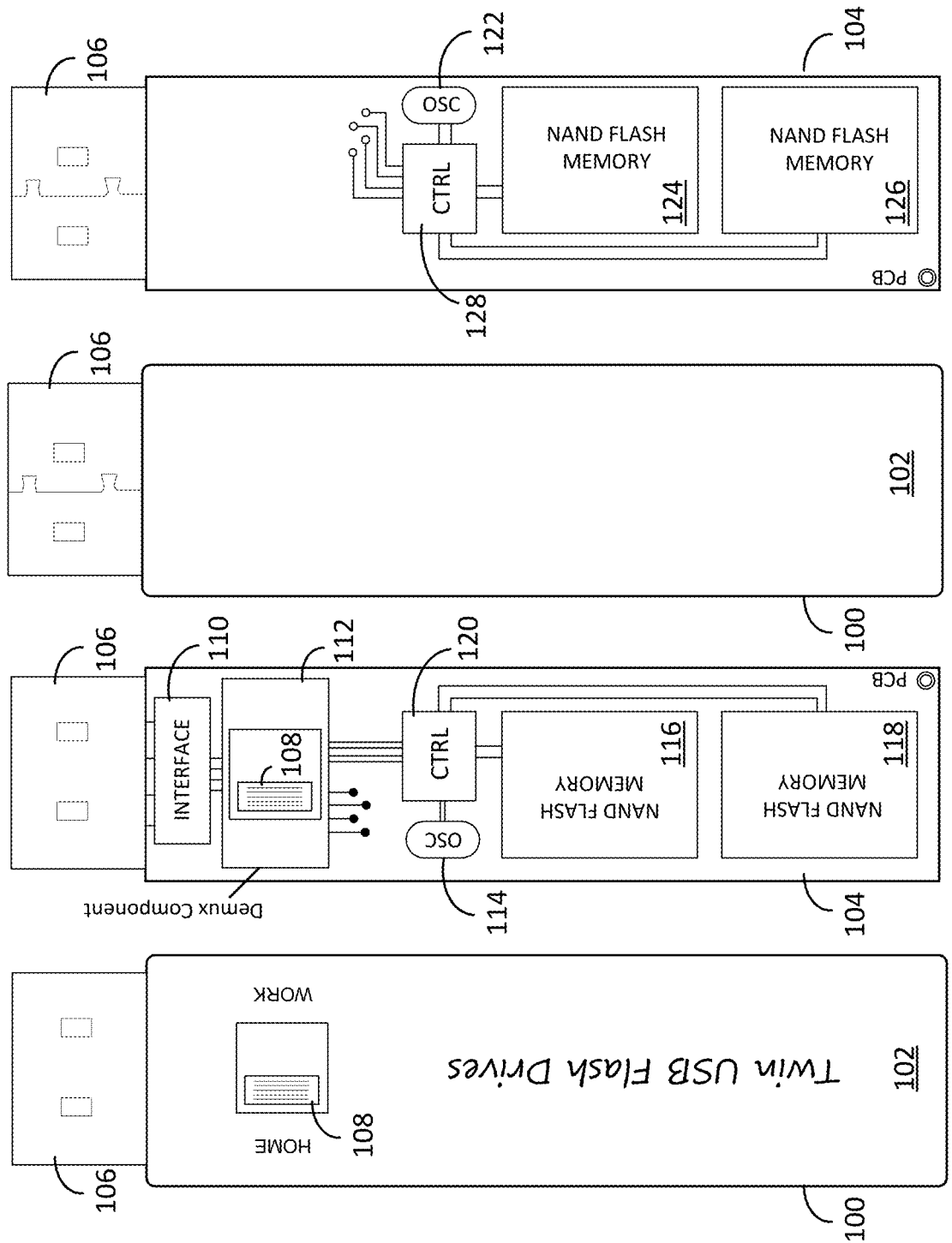

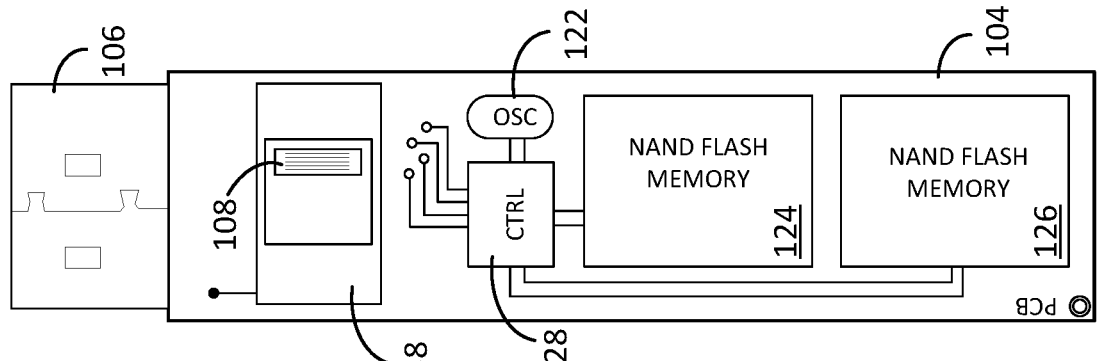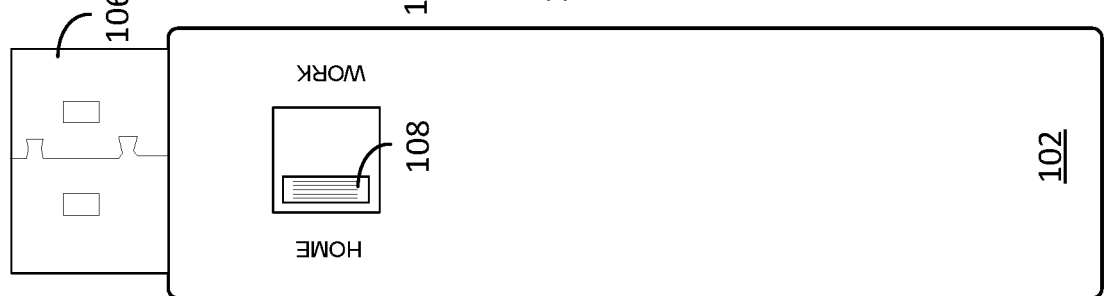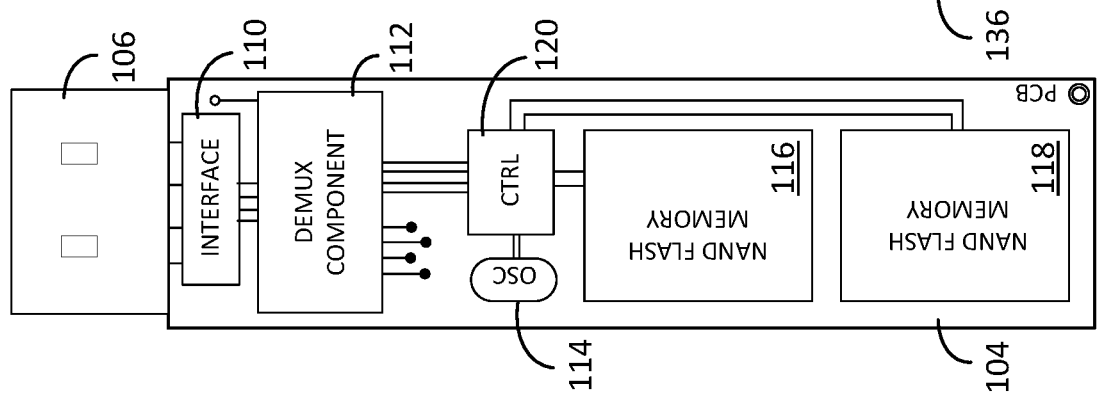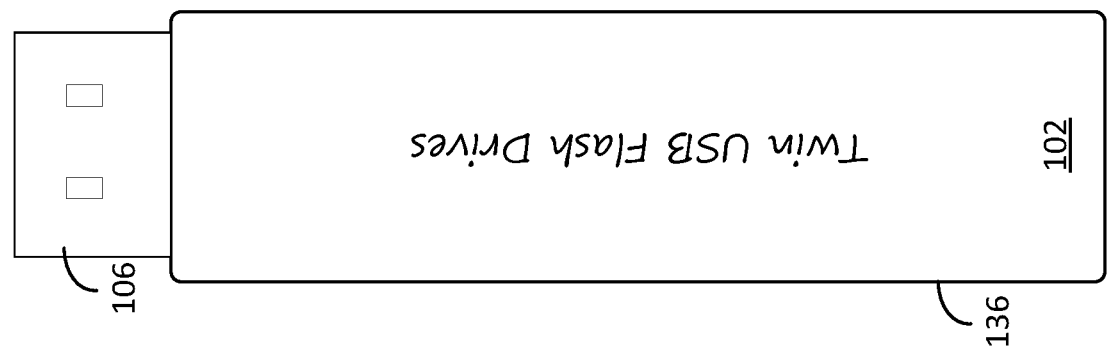

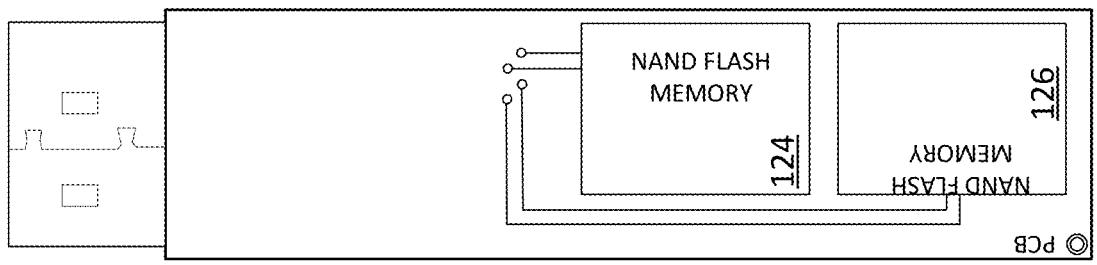
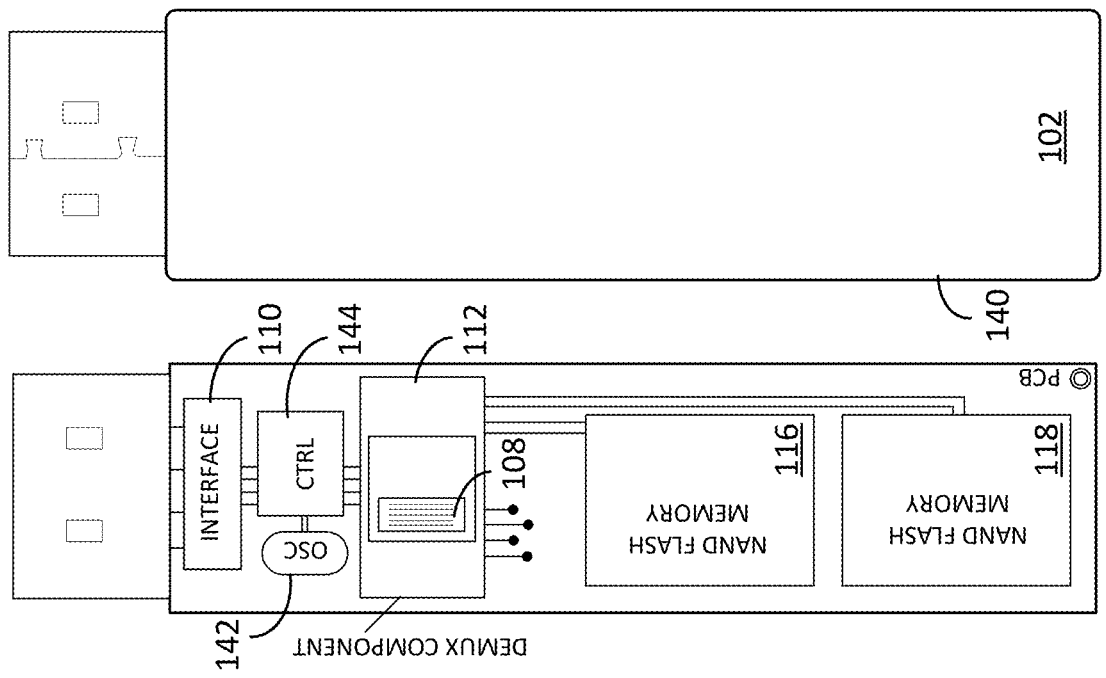
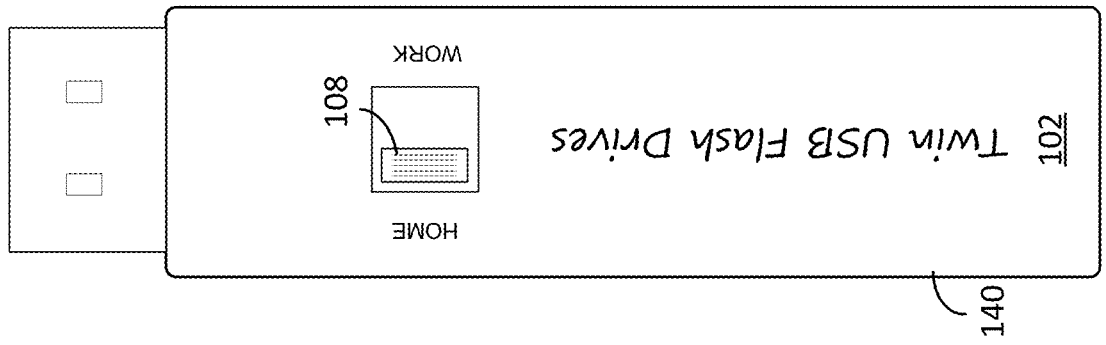

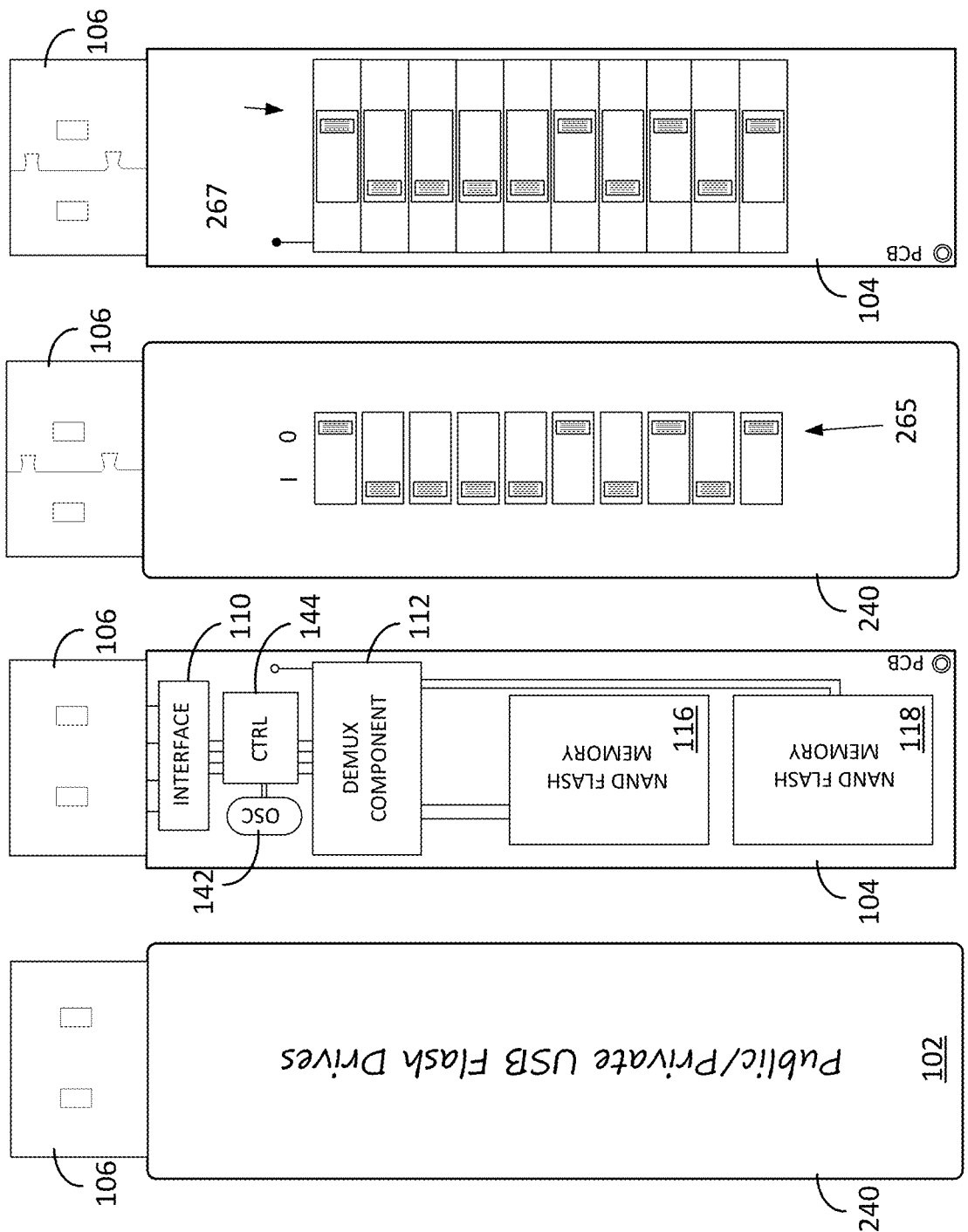

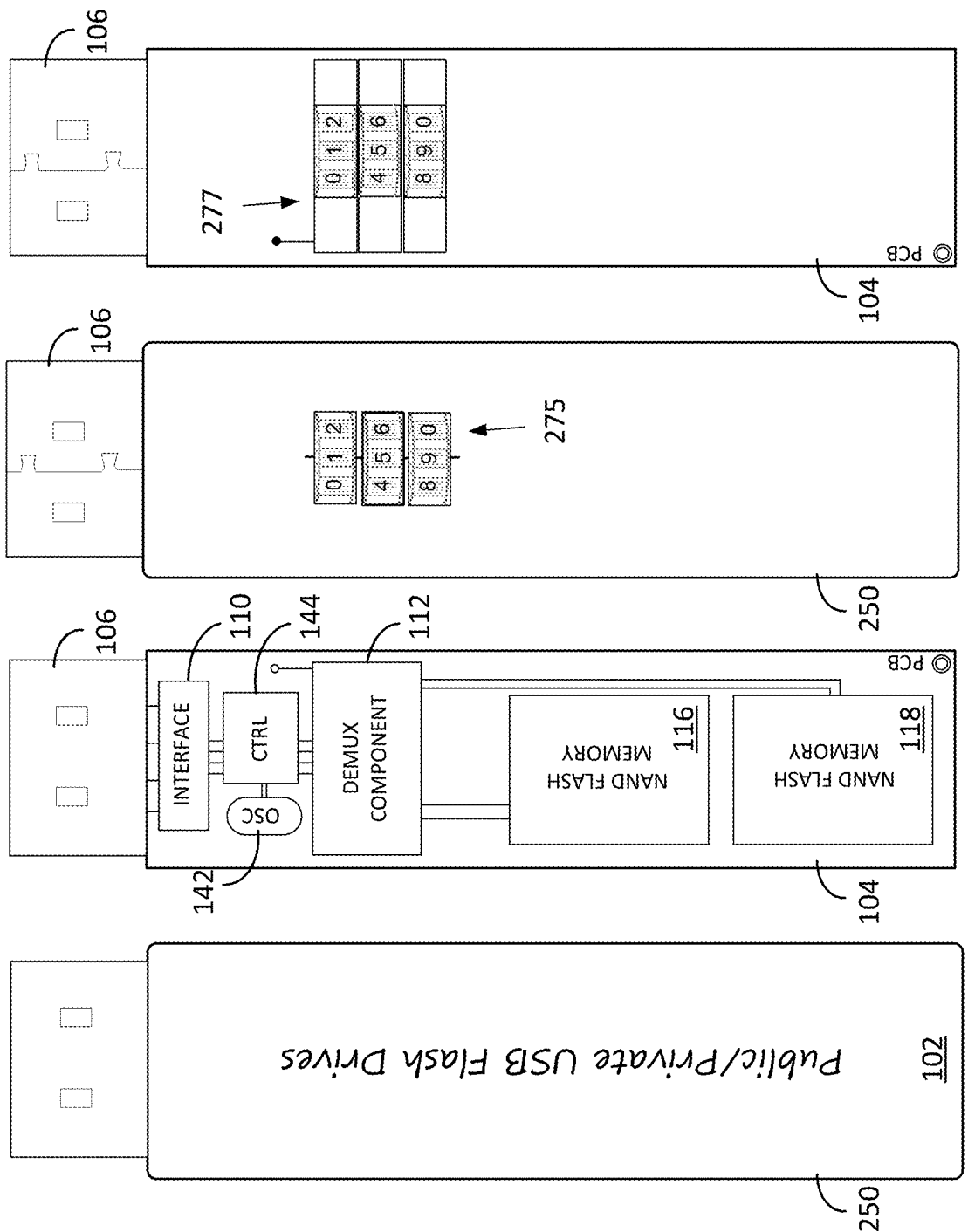

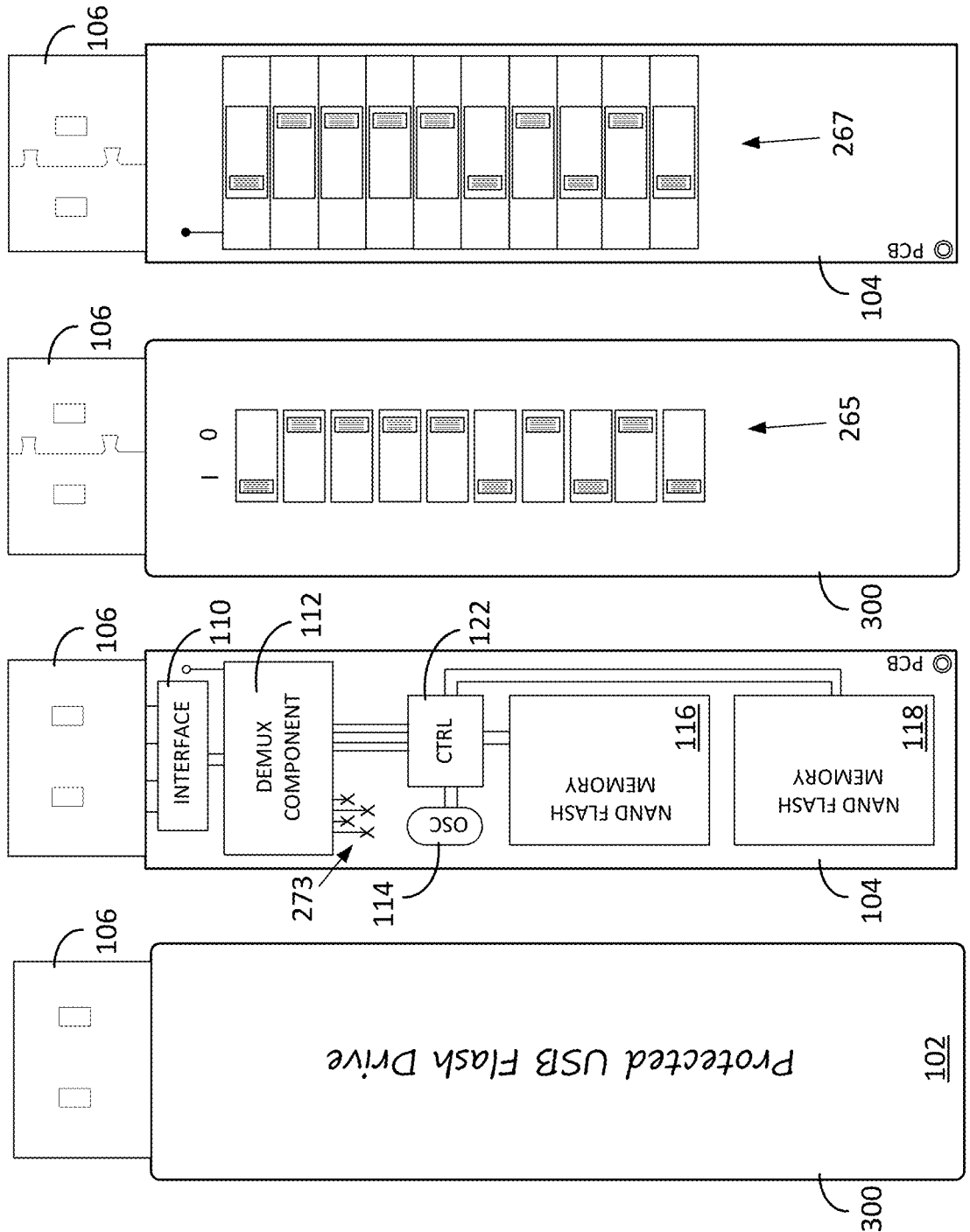

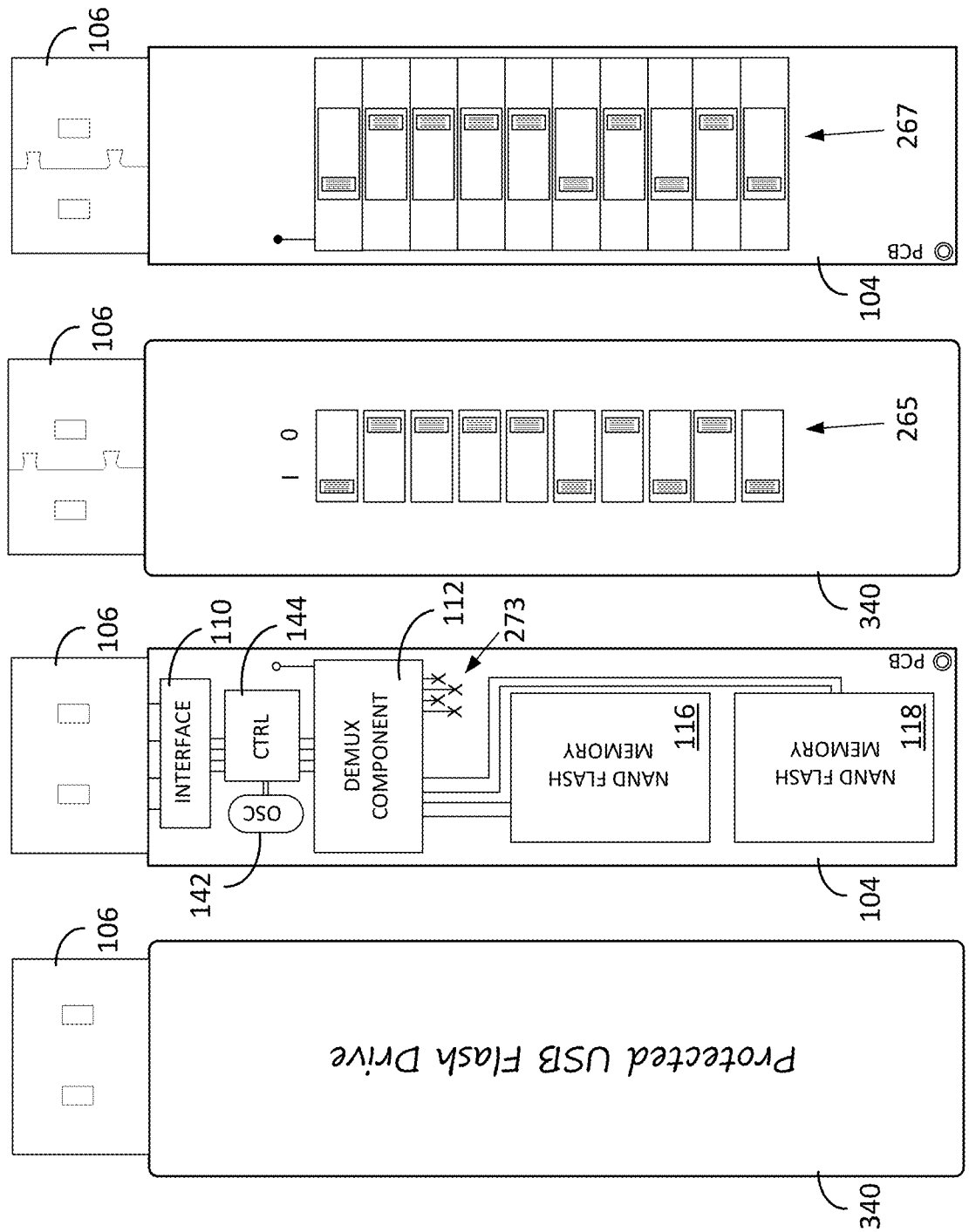

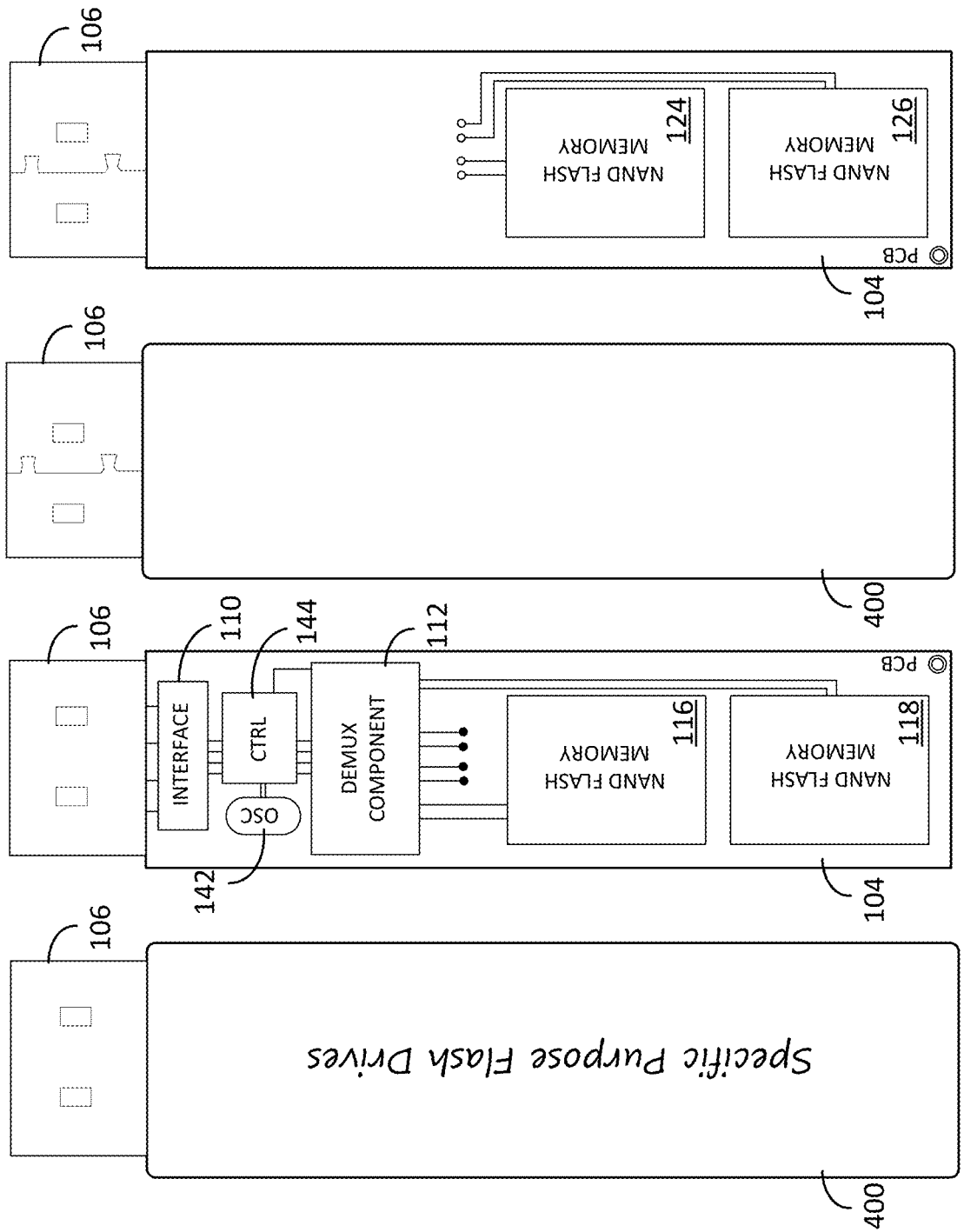

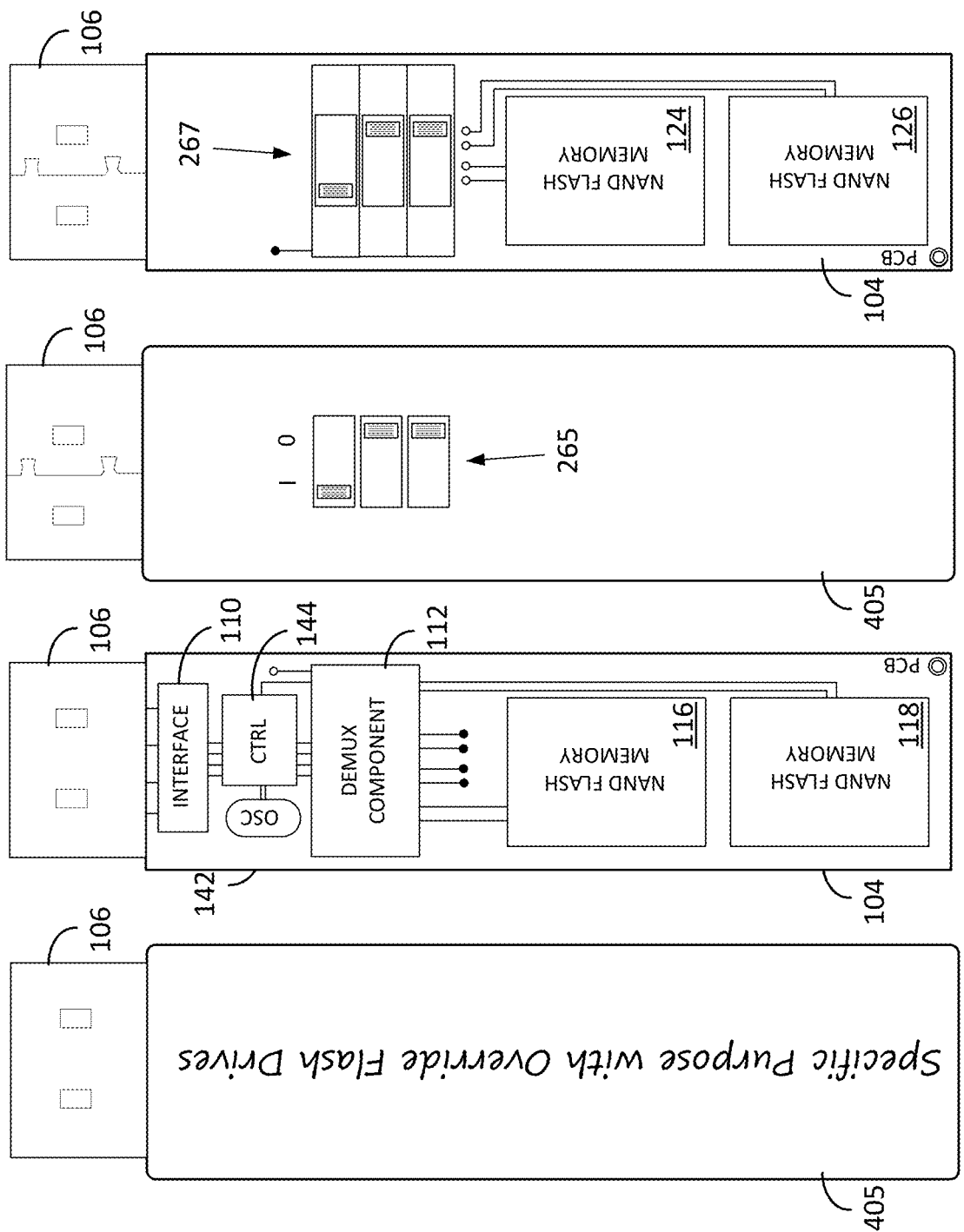

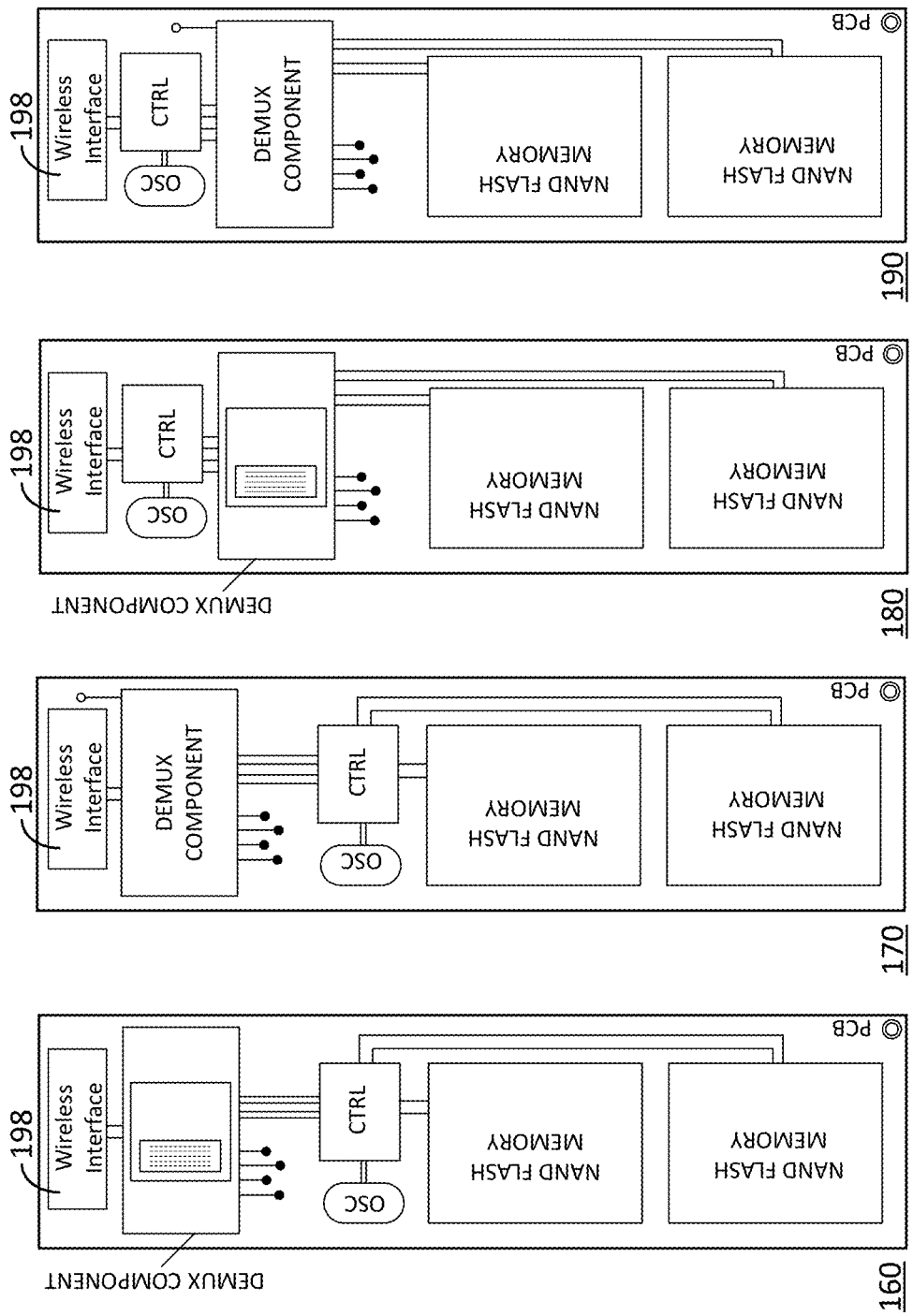

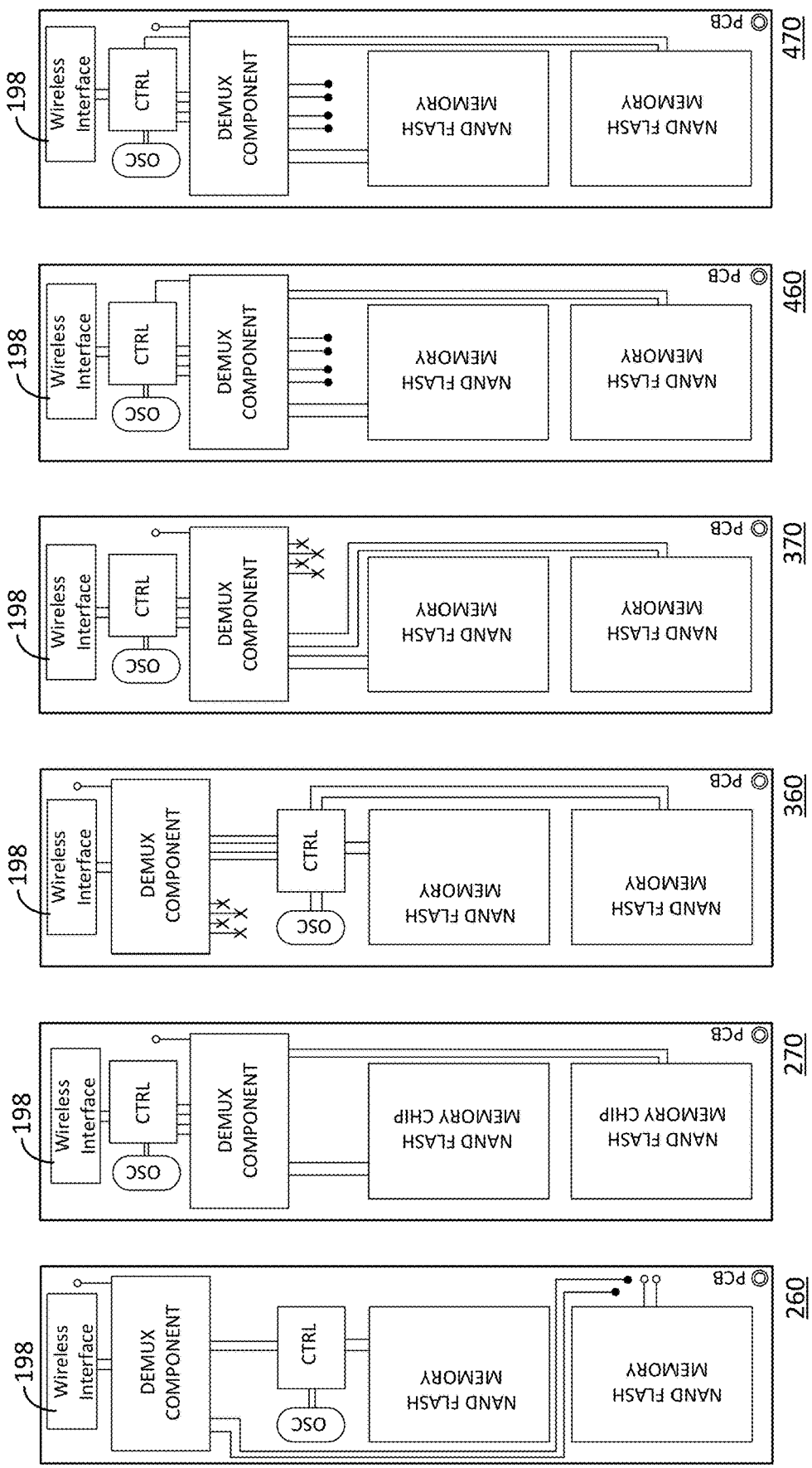

PORTABLE MEMORY DEVICE HAVING MUTUALLY EXCLUSIVE NON-VOLATILE ELECTRONIC DATA STORAGE

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The present invention generally relates to portable memory devices and, in preferred embodiments, to flash-drive apparatus having one or more mutually exclusive flash drives.

Flash drives are inexpensive and generally ubiquitous. An exemplary flash drive 900 of the prior art is seen in FIG. 57 of the patent application publication U.S. 2020/0241800 A1 ("the '800 Publication"), which is the publication of the current application and which is incorporated herein by reference. . The flash drive 900 comprises a USB connector 901 and casing 903. The flash drive 900 further comprise a physical control element in the form of a slide switch 905 on the exterior of the casing 903 that is manually transitionable by hand between a locked position, in which information can be read from memory of the flash drive 900 but information cannot be written to the memory of the flash drive 900; and an unlocked position, in which information can be written to the memory of the flash drive 900 and information can be read from the memory of the flash drive 900.

Another flash drive 930 of the prior art is seen in FIG. 58 of the '800 Publication and includes a keypad 935 for entering a code into the flash drive 930, which must be done in order to access the flash drive 930 for reading of information from a memory of the flash drive 930 and writing of information to the memory of the flash drive 930. The keypad also includes keys for locking and unlocking writing to the memory of the flash drive 930.

Yet another flash drive 950 of the prior art is represented in FIGS. 59 and 60 the '800 Publication, wherein the outer casing of the flash drive 950 is omitted such that a top of the interior of the flash drive 950 is seen in FIG. 59 of the '800 Publication and a bottom of the interior of the flash drive 950 is seen in FIG. 60 of the '800 Publication. As seen in FIGS. 59-60 the '800 Publication, components of the flash drive 950 are connected to a printed circuit board. The contents include a USB connector 1; a USB mass storage controller or the controller chip 2; test points comprising electrical pins 3 that facilitate manufacturing of the flash drive; a NAND flash memory chip 4: a crystal oscillator 5 comprising a piece of quartz crystal designed to vibrate at a very particular frequency, which is used as a digital clock; an LED indicator light 6 that that is used to indicate if the flash drive is working and functioning; a write-protect switch 7; an additional space 8 for accommodating another NAND flash memory chip for increasing the storage capacity of the flash drive by the manufacturer.

While the flash drives of the prior art are suitable for their intended purposes, it is believed that a need exists for improvement in flash drives and, in particular, for improvement in flash drives that facilitate the lending of flash drives for temporary use by others. Indeed, the aforementioned flash drives enable write-protection but do nothing to facilitate the lending of flash drives for use by others insofar as a lender is unable to ascertain if any files are on the flash drive prior to lending out the flash drive and thus the lender must utilize a computer to review and remove any contents of the flash drive prior to such lending if any information contained therein is sensitive or private. Additionally, while a code must be entered to access the flash drive 930, requiring such a code for use by someone borrowing the flash drive defeats the purpose of having the code for protection of the lender's information. Accordingly, it is believed that a need also exists for improvement in how information on a flash drive is protected from discovery and use by those who may borrow the flash drive for temporary use. All of the aforementioned flash drives also are "single" use flash drives. A need is believed to exist for improvement in flash drive apparatus whereby multiple single-use flash drives are provided, each facilitating a particular use with a different purpose. These, and other needs, are believed to be addressed by one or more aspects and features of the present invention.

SUMMARY OF THE INVENTION

The present invention includes many aspects and features. Moreover, while many aspects and features relate to, and are described in, the context of USB flash drives, the present invention is not limited to use only in such context, as will become apparent from the following summaries and detailed descriptions of aspects, features, and one or more embodiments of the present invention.

Accordingly, many aspects of the present invention generally relate to portable memory device. In such an aspect, a portable memory device comprises: a board for providing electronic communication pathways; an interface connected to the board for enabling communications between the portable memory device and an external device; a plurality of data storage groups connected to the board, each data storage group comprising a controller and one or more memory storage components including non-volatile memory for reading, writing, and storing of data, and each data storage group managing both communications between the portable memory device and an external device through the interface, and reading of data from and writing of data to its respective one or more memory storage components; and a demux component connected to the board and configured to connect the interface with each data storage group of the plurality of data storage groups, the connections of the interface with the data storage groups being mutually exclusive of each other. A first one of the plurality of data storage groups provides a first non-volatile electronic data storage when the interface is connected therewith by the demux component for use by an external device through the interface; a second one of the plurality of data storage groups provides a second, different non-volatile electronic data storage when the interface is connected therewith by the demux component for use by an external device through the interface; and the provision of the first non-volatile electronic data storage is mutually exclusive of the provision of the second, different non-volatile electronic data storage for use by an external device through the interface. Preferably, in at least some embodiments, the portable memory device comprises an oscillator component connected to the board.

In a feature of this aspect, a mutually exclusive connection of the interface with one of the data storage groups is made based on manual manipulation of one or more physical control elements of the portable memory device.

In a feature of this aspect, each data storage group of the plurality of data storage groups comprises an oscillator component that is used therewith when such data storage group is connected by the demux component with the interface. The oscillator component of each data storage group of the plurality of data storage groups preferably comprises a crystal oscillator.

In a feature of this aspect, the portable memory device comprises an oscillator component connected to the board for providing a clock signal and the oscillator component is the only oscillator component of the portable memory device and is used in conjunction with each data storage group when such data storage group is connected by the demux component with the interface. The oscillator component preferably comprises a crystal oscillator.

In a feature of this aspect, each data storage group of the plurality comprises a micro controller chip.

In a feature of this aspect, each data storage group of the plurality comprises a USB controller.

In a feature of this aspect, each data storage group of the plurality comprises a flash-memory controller. Preferably each data storage group of the plurality performs flash-translation-layer functions.

In a feature of this aspect, each data storage group of the plurality comprises flash memory. Preferably, the flash memory comprises NAND flash memory.

In a feature of this aspect, the board comprises a printed circuit board.

In a feature of this aspect, each non-volatile electronic data storage comprises a USB mass storage device. The interface may comprise a USB 2.0 interface or a USB 3.0 interface.

In a feature of this aspect, the first non-volatile electronic data storage comprises a bootable USB mass storage device.

In a feature of this aspect, the interface comprises a wireless transmitter and a wireless receiver for wireless communications. The interface may be configured for WiFi communications, for Bluetooth communications, or both.

In a feature of this aspect, the portable memory device further comprises an outer casing enclosing the board, and wherein the one or more physical control elements are located on an exterior of the casing.

In a feature of this aspect, the one or more physical control elements comprise one or more slide switches.

In a feature of this aspect, the one or more physical control elements comprise one or more thumb wheel switches.

In a feature of this aspect, the one or more physical control elements comprise one or more toggle switches.

In an aspect, a portable memory device comprises: a board for providing electronic communication pathways; an interface connected to the board for enabling communications between the portable memory device and an external device; a controller group connected to the board for managing both communications between the portable memory device and an external device through the interface, and reading of data from and writing of data to one or more memory storage components; a plurality of memory storage groups connected to the board, each memory storage group comprising one or more memory storage components including non-volatile memory for reading, writing, and storing of data; and a demux component connected to the board and configured to connect the controller group with each memory storage group of the plurality of memory storage groups, the connections of the controller group with the memory storage groups being mutually exclusive of each other. A first non-volatile electronic data storage is provided for use by an external device through the interface when the controller group is connected with a first memory storage group of the plurality by the demux component. A second, different non-volatile electronic data storage is provided for use by an external device through the interface when the controller group is connected with a second, different memory storage group of the plurality by the demux component. The provision of the first non-volatile electronic data storage for use by an external device through the interface is mutually exclusive of the provision of the second, different non-volatile electronic data storage for use by an external device through the interface.

In a feature of this aspect, the controller group comprises a micro controller chip.

In a feature of this aspect, the controller group comprises a USB controller.

In a feature of this aspect, the controller group comprises a flash-memory controller.

In a feature of this aspect, the controller group performs flash-translation-layer functions.

In a feature of this aspect, the portable memory device comprises an oscillator component connected to the board for providing a clock signal, and the oscillator component comprises a crystal oscillator.

In a feature of this aspect, the portable memory device comprises an oscillator component connected to the board for providing a clock signal, and the oscillator component is the only oscillator component of the portable memory device.

In a feature of this aspect, a mutually exclusive connection of the interface with one of the memory storage groups is made based on an identification of an external device using the portable memory device.

The identification may uniquely identify the external device. The interface of the portable memory device may comprise a USB plug, and an identification of the external device is provided upon manually plugging the USB plug into a USB port of the external device. The identification may identify a type of the external device, the identification may identify a manufacturer of the external device, or both.

In a feature of this aspect, each memory storage group of the plurality comprises flash memory.

In a feature of this aspect, each memory storage group of the plurality comprises a flash-memory controller.

In a feature of this aspect, a mutually exclusive connection of the interface with one of the memory storage groups is made based on manual manipulation of one or more physical control elements of the portable memory device. Preferably, the portable memory device comprises an oscillator component connected to the board for providing a clock signal, and further comprises a casing enclosing the board, oscillator, controller group, each of the plurality of memory storage groups, and demux component. The one or more physical control elements preferably are located on an exterior of the casing and may comprise one or more slide switches, one or more thumb wheel switches, one or more toggle switches, and combinations thereof.

In a feature of this aspect, the board comprises a printed circuit board.

In a feature of this aspect, each non-volatile electronic data storage comprises a USB mass storage device.

In a feature of this aspect, the first non-volatile electronic data storage comprises a bootable USB mass storage device.

In a feature of this aspect, the interface comprises a wireless transmitter and a wireless receiver for wireless communications.

In an aspect, a portable memory device for providing mutually exclusive non-volatile electronic data storage comprises: a board for providing electronic communication pathways; an interface connected to the board for enabling communications between the portable memory device and an external device; a first group of components connected to the board and arranged to provide a first non-volatile electronic data storage when coupled to the interface; a second group of components connected to the board and arranged to provide a second non-volatile electronic data storage when coupled to the interface; and a manually operated control transitionable to a first configuration for effecting coupling of the interface to the first group of components to the exclusion of coupling of the interface to the second group of components, and a second configuration for effecting coupling of the interface to the second group of components to the exclusion of coupling of the interface to the first group of components. The manually operated control is in the first configuration, the first group of components are coupled to the interface and provide the first non-volatile electronic data storage for use by an external device; and when the manually operated control is in the second configuration, the second group of components are coupled to the interface and provide the second non-volatile electronic data storage for use by an external device.

In a feature of this aspect, the board comprises a printed circuit board.

In a feature of this aspect, each non-volatile electronic data storage comprises a USB mass storage device.

In a feature of this aspect, the first non-volatile electronic data storage comprises a bootable USB mass storage device.

In a feature of this aspect, the interface comprises a wireless transmitter and a wireless receiver for wireless communications.

In an aspect, a portable memory device for providing mutually exclusive non-volatile electronic data storage comprises: a board for providing electronic communication pathways; an interface connected to the board for enabling communications between the portable memory device and an external device; a first group of components connected to the board and arranged to provide a first non-volatile electronic data storage when coupled to the interface; a second group of components connected to the board and arranged to provide a second non-volatile electronic data storage when coupled to the interface; and, a manually operated control transitionable to different configurations for effecting coupling of the first group of components to the interface to the exclusion of coupling of the second group of components to the interface, and for effecting coupling of the second group of components to the interface to the exclusion of coupling of the first group of components to the interface. When the manually operated control is in a first configuration, the first group of components are coupled to the interface of the portable memory device and provide the first non-volatile electronic data storage for use by an external device through the interface; and when the manually operated control is not in the first configuration, the second group of components are coupled to the interface of the portable memory device and provide the second non-volatile electronic data storage for use by an external device through the interface.

In a feature of this aspect, the board comprises a printed circuit board.

In a feature of this aspect, each non-volatile electronic data storage comprises a USB mass storage device.

In a feature of this aspect, the first non-volatile electronic data storage comprises a bootable USB mass storage device.

In a feature of this aspect, the interface comprises a wireless transmitter and a wireless receiver for wireless communications.

In an aspect, a portable memory device for providing non-volatile electronic data storage for use by an external device comprises: a board for providing electronic communication pathways; an interface connected to the board for enabling communications between the portable memory device and an external device; a group of components connected to the board and arranged to provide a certain non-volatile electronic data storage when coupled to the interface; and a manually operated control transitionable to different configurations for effecting coupling and decoupling of the group of components and the interface. When the manually operated control is in a certain configuration of the different configurations, the group of components and the interface are coupled and the certain non-volatile electronic data storage is provided for use by an external device through the interface; and when the manually operated control is not in the certain configuration, the group of components and the interface are decoupled and the certain non-volatile electronic data storage is not provided for use by an external device through the interface.

In a feature of this aspect, the board comprises a printed circuit board.

In a feature of this aspect, the certain non-volatile electronic data storage comprises a USB mass storage device.

In a feature of this aspect, the certain non-volatile electronic data storage comprises a bootable USB mass storage device.

In a feature of this aspect, the interface comprises a wireless transmitter and a wireless receiver for wireless communications.

In an aspect, a portable memory device for providing non-volatile electronic data storage for use by an external device comprises: a board for providing electronic communication pathways; an interface connected to the board for enabling communications between the portable memory device and an external device; a group of components connected to the board and configured to provide, when coupled with the interface, the non-volatile electronic data storage for use by an external device through the interface; and, a manually operated control transitionable by hand to different configurations for effecting coupling and decoupling of the group of components and the interface. When the manually operated control is in a use configuration, the group of components and the interface are coupled and the non-volatile electronic data storage is provided for use by an external device through the interface; and when the manually operated control is not in the use configuration, the group of components and the interface are decoupled and no non-volatile electronic data storage is provided for use by an external device through the interface.

In a feature of this aspect, the board comprises a printed circuit board.

In a feature of this aspect, the non-volatile electronic data storage comprises a USB mass storage device.

In a feature of this aspect, the non-volatile electronic data storage comprises a bootable USB mass storage device.

In a feature of this aspect, the interface comprises a wireless transmitter and a wireless receiver for wireless communications. The manually operated control preferably comprise an arrangement physical control elements including, for example, one or more slide switches, one or more thumb wheel switches, one or more toggle switches, and combinations thereof.

In an aspect, a portable memory device for providing non-volatile electronic data storage for use by an external device comprises: a board for providing electronic communication pathways; an interface connected to the board for enabling communications between the portable memory device and an external device; a group of components connected to the board and arranged to provide a certain non-volatile electronic data storage when coupled to the interface; and means for effecting coupling and decoupling of the group of components and the interface. When the manually operated control is in a certain configuration of the different configurations, the group of components and the interface are coupled and provide the certain non-volatile electronic data storage for use by an external device through the interface; and, when the manually operated control is not in the certain configuration, the group of components and the interface are decoupled and the certain non-volatile electronic data storage is not provided for use by an external device through the interface.

In a feature of this aspect, the certain non-volatile electronic data storage comprises a USB mass storage device.

In a feature of this aspect, the certain non-volatile electronic data storage comprises a bootable USB mass storage device.

In a feature of this aspect, when the manually operated control is not in the certain configuration, the group of components and the interface are decoupled and no non-volatile electronic data storage is provided for use by an external device through the interface.

In an aspect, a portable memory device for providing non-volatile electronic data storage for use by an external device comprises: a board for providing electronic communication pathways; an interface connected to the board for enabling communications between the portable memory device and an external device; a group of components connected to the board and arranged to provide a non-volatile electronic data storage when coupled to the interface for use by an external device through the interface; and means for coupling and decoupling the group of components and the interface.

In a feature of this aspect, the board comprises a printed circuit board.

In a feature of this aspect, the certain non-volatile electronic data storage comprises a USB mass storage device.

In a feature of this aspect, the certain non-volatile electronic data storage comprises a bootable USB mass storage device.

In a feature of this aspect, the interface comprises a wireless transmitter and a wireless receiver for wireless communications.

In an aspect, a portable memory device comprises: a board for providing electronic communication pathways; an interface connected to the board for enabling communications between the portable memory device and an external device; a plurality of mass storage device groups connected to the board, each mass storage device group comprising a controller and one or more memory storage components including non-volatile memory for reading, writing, and storing of data, and each mass storage device group managing both communications between the portable memory device and an external device through the interface, and reading of data from and writing of data to its respective one or more memory storage components; and, a demux component connected to the board and configured to connect the interface with each mass storage device group of the plurality of mass storage device groups, the connections of the interface with the mass storage device groups being mutually exclusive of each other. A first one of the plurality of mass storage device groups provides a first mass storage device when the interface is connected therewith by the demux component, by which first mass storage device an external device uses the portable memory device; a second one of the plurality of mass storage device groups provides a second, different mass storage device when the interface is connected therewith by the demux component, by which second, different mass storage device an external device uses the portable memory device; and, the provision of the first mass storage device for use by an external device is mutually exclusive of the provision of the second, different mass storage device for use by an external device, and a mutually exclusive connection of the interface with one of the mass storage device groups is made based on manual manipulation of one or more physical control elements of the portable memory device.

In a feature of this aspect, each mass storage device group of the plurality of mass storage device groups comprises an oscillator component that is used therewith when such mass storage device group is connected by the demux component with the interface. The oscillator component of each mass storage device group of the plurality of mass storage device groups preferably comprises a crystal oscillator.

In a feature of this aspect, the portable memory device comprises an oscillator component connected to the board for providing a clock signal, and the oscillator component is the only oscillator component of the portable memory device and is used in conjunction with each mass storage device group when such mass storage device group is connected by the demux component with the interface. The oscillator component preferably comprises a crystal oscillator.

In a feature of this aspect, each mass storage device group of the plurality of mass storage device groups comprises an oscillator component that is used therewith when such mass storage device group is connected by the demux component with the interface, and the oscillator component of each mass storage device group of the plurality of mass storage device groups preferably comprises a crystal oscillator.

In a feature of this aspect, each mass storage device group of the plurality comprises a micro controller chip.

In a feature of this aspect, each mass storage device group of the plurality comprises a USB controller.

In a feature of this aspect, each mass storage device group of the plurality comprises a flash-memory controller.

In a feature of this aspect, each mass storage device group of the plurality comprises flash memory.

In a feature of this aspect, the board comprises a printed circuit board.

In a feature of this aspect, each mass storage device comprises a USB mass storage device.

In a feature of this aspect, the first mass storage device comprises a bootable USB mass storage device.

In a feature of this aspect, the interface comprises a wireless transmitter and a wireless receiver for wireless communications.

In a feature of this aspect, the portable memory device further comprises an outer casing enclosing the board, and wherein the one or more physical control elements are located on an exterior of the casing.

In a feature of this aspect, the one or more physical control elements comprise one or more slide switches.

Ina feature of this aspect, the one or more physical control elements comprise one or more thumb wheel switches.

In a feature of this aspect, the one or more physical control elements comprise one or more toggle switches.

In an aspect, a portable memory device, comprises: a board for providing electronic communication pathways; an interface connected to the board for enabling communications between the portable memory device and an external device; a controller group connected to the board for managing both communications between the portable memory device and an external device through the interface, and reading of data from and writing of data to one or more memory storage components; a plurality of memory storage groups connected to the board, each memory storage group comprising one or more memory storage components including non-volatile memory for reading, writing, and storing of data; and a demux component connected to the board and configured to connect the controller group with each memory storage group of the plurality of memory storage groups, the connections of the controller group with the memory storage groups being mutually exclusive of each other. A first mass storage device is provided when the controller group is connected with a first memory storage group of the plurality by the demux component, by which first mass storage device an external device uses the portable memory device; a second, different mass storage device is provided when the controller group is connected with a second, different memory storage group of the plurality by the demux component, by which second, different mass storage device an external device uses the portable memory device; and, the provision of the first mass storage device for use by an external device is mutually exclusive of the provision of the second, different mass storage device for use by an external device.

In a feature of this aspect, the controller group comprises a micro controller chip.

In a feature of this aspect, the controller group comprises a USB controller.

In a feature of this aspect, the controller group comprises a flash-memory controller.

In a feature of this aspect, the controller group performs flash-translation-layer functions.

In a feature of this aspect, the portable memory device comprises an oscillator component connected to the board for providing a clock signal, and the oscillator component comprises a crystal oscillator.

In a feature of this aspect, the portable memory device comprises an oscillator component connected to the board for providing a clock signal, and the oscillator component is the only oscillator component of the portable memory device.

In a feature of this aspect, a mutually exclusive connection of the interface with one of the memory storage groups is made based on an identification of an external device using the portable memory device. The identification may uniquely identify the external device. When the interface of the portable memory device comprises a USB plug, an identification of the external device preferably is provided upon manually plugging the USB plug into a USB port of the external device, and the identification may identify a type or a manufacturer of the external device.

In a feature of this aspect, each memory storage group of the plurality comprises flash memory.

In a feature of this aspect, each memory storage group of the plurality comprises a flash-memory controller.

In a feature of this aspect, a mutually exclusive connection of the interface with one of the memory storage groups is made based on manual manipulation of one or more physical control elements of the portable memory device. The portable memory device may comprise an oscillator component connected to the board for providing a clock signal, and further may comprise a casing enclosing the board, oscillator, controller group, each of the plurality of memory storage groups, and demux component, and the one or more physical control elements may be located on an exterior of the casing. The one or more physical control elements may comprise one or more slide switches; one or more thumb wheel switches; one or more toggle switches; and, combinations thereof.

In a feature of this aspect, the board comprises a printed circuit board.

In a feature of this aspect, each mass storage device comprises a USB mass storage device.

In a feature of this aspect, the first mass storage device comprises a bootable USB mass storage device.

In a feature of this aspect, the interface comprises a wireless transmitter and a wireless receiver for wireless communications.

In a feature of this aspect, the interface is configured for Bluetooth communications.

In an aspect, a portable memory device for providing mutually exclusive mass storage devices comprises: a board for providing electronic communication pathways; an interface connected to the board for enabling communications between the portable memory device and an external device; a first group of components connected to the board and arranged to provide a first mass storage device when coupled to the interface; a second group of components connected to the board and arranged to provide a second mass storage device when coupled to the interface; and, an arrangement of one or more physical control elements transitionable by hand to a first configuration for effecting coupling of the interface to the first group of components to the exclusion of coupling of the interface to the second group of components, and to a second configuration for effecting coupling of the interface to the second group of components to the exclusion of coupling of the interface to the first group of components. When the arrangement is in the first configuration, the first group of components are coupled to the interface and provide the first mass storage device for use by an external device; and, when the arrangement is in the second configuration, the second group of components are coupled to the interface and provide the second mass storage device for use by an external device.

In a feature of this aspect, the board comprises a printed circuit board.

In a feature of this aspect, the arrangement comprises one or more slide switches.

In a feature of this aspect, the arrangement comprises one or more thumb wheel switches.

In a feature of this aspect, the arrangement comprises one or more toggle switches.

In a feature of this aspect, when the arrangement is transitioned to the first configuration, the interface is physically coupled by such transition to the first group of components; and, when the arrangement is transitioned to the second configuration, the interface is physically coupled by such transition to the second group of components.

In a feature of this aspect, the portable memory device further comprises a demux component connected to the board and configured to couple the first group of components and the interface when the arrangement is indicated to be in the first configuration, and to couple the second group of components and the interface when the arrangement is indicated to be in the second configuration.

In a feature of this aspect, when the arrangement is transitioned to the first configuration, such state is indicated to the demux component; and, when the arrangement is transitioned to the second configuration, such state is indicated to the demux component. The state of the arrangement preferably is indicated by a control signal, which the control signal may be communicated from the arrangement to the demux component.

In a feature of this aspect, the arrangement comprises a slide switch movable between first and second ends, wherein the first end is labeled "HOME", "DRIVE A", or "DISK 1", and wherein the second end is labeled "WORK", "DRIVE B", or "DISK 2".

In an aspect, a portable memory device for providing mutually exclusive mass storage devices comprises: a board for providing electronic communication pathways; an interface connected to the board for enabling communications between the portable memory device and an external device; a first group of components connected to the board and arranged to provide a first mass storage device when coupled to the interface; a second group of components connected to the board and arranged to provide a second mass storage device when coupled to the interface; and, an arrangement of one or more physical control elements transitionable by hand to different configurations for effecting coupling of the first group of components to the interface to the exclusion of coupling of the second group of components to the interface, and for effecting coupling of the second group of components to the interface to the exclusion of coupling of the first group of components to the interface. When the arrangement is in a first configuration, the first group of components are coupled to the interface of the portable memory device and provide the first mass storage device for use by an external device through the interface; and when the arrangement is not in the first configuration, the second group of components are coupled to the interface of the portable memory device and provide the second mass storage device for use by an external device through the interface.

In a feature of this aspect, the board comprises a printed circuit board.

In a feature of this aspect, each mass storage device comprises a USB mass storage device.

In a feature of this aspect, the first mass storage device comprises a bootable USB mass storage device.

In a feature of this aspect, the interface comprises a wireless transmitter and a wireless receiver for wireless communications.

In a feature of this aspect, the portable memory device further comprises an outer casing enclosing the board, and wherein the one or more physical control elements are located on an exterior of the casing.

In a feature of this aspect, the one or more physical control elements comprise one or more slide switches.

In a feature of this aspect, the one or more physical control elements comprise one or more thumb wheel switches.

In a feature of this aspect, the one or more physical control elements comprise one or more toggle switches.

In an aspect of the invention, a portable memory device for providing a mass storage device for use by an external device comprises: a board for providing electronic communication pathways; an interface connected to the board for enabling communications between the portable memory device and an external device; a group of components connected to the board and arranged to provide a certain mass storage device when coupled to the interface; and, an arrangement of one or more physical control elements transitionable by hand to different configurations for effecting coupling and decoupling of the group of components and the interface. When the arrangement is in a certain configuration of the different configurations, the group of components and the interface are coupled and provide the certain mass storage device for use by an external device through the interface; and, when the arrangement is not in the certain configuration, the group of components and the interface are decoupled and the certain mass storage device is not provided for use by an external device through the interface.

In a feature of this aspect, the board comprises a printed circuit board.

In a feature of this aspect, the certain mass storage device comprises a USB mass storage device.

In a feature of this aspect, the certain mass storage device comprises a bootable USB mass storage device.

In a feature of this aspect, the interface comprises a wireless transmitter and a wireless receiver for wireless communications.

In a feature of this aspect, the portable memory device further comprises an outer casing enclosing the board, and wherein the one or more physical control elements are located on an exterior of the casing.

In a feature of this aspect, the one or more physical control elements comprise one or more slide switches.

In a feature of this aspect, the one or more physical control elements comprise one or more thumb wheel switches.

In a feature of this aspect, the one or more physical control elements comprise one or more toggle switches.

In an aspect of the invention, a portable memory device for providing a mass storage device for use by an external device comprises: a board for providing electronic communication pathways; an interface connected to the board for enabling communications between the portable memory device and an external device; a group of components connected to the board and arranged to provide a mass storage device when coupled to the interface; and, an arrangement of physical control elements transitionable by hand to different configurations for effecting coupling and decoupling of the group of components and the interface. When the arrangement is in a use configuration, the group of components and the interface are coupled and provide the mass storage device of the portable memory device for use by an external device through the interface; and, when the arrangement is not in the use configuration, the group of components and the interface are decoupled and no mass storage device of the portable memory device is provided for use by an external device through the interface.

In a feature of this aspect, the board comprises a printed circuit board.

In a feature of this aspect, the mass storage device comprises a USB mass storage device.

In a feature of this aspect, the mass storage device comprises a bootable USB mass storage device.

In a feature of this aspect, the interface comprises a wireless transmitter and a wireless receiver for wireless communications.

In a feature of this aspect, the portable memory device further comprises an outer casing enclosing the board, and wherein the one or more physical control elements are located on an exterior of the casing.

In a feature of this aspect, the one or more physical control elements comprise one or more slide switches.

In a feature of this aspect, the one or more physical control elements comprise one or more thumb wheel switches.

In a feature of this aspect, the one or more physical control elements comprise one or more toggle switches.

In an aspect of the invention, a portable memory device for providing a mass storage device for use by an external device comprises: a board for providing electronic communication pathways; an interface connected to the board for enabling communications between the portable memory device and an external device; a group of components connected to the board and arranged to provide a certain mass storage device when coupled to the interface; and, means for coupling and decoupling the group of components and the interface.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

FIG. 1 is a schematic top view of a flash-drive apparatus in accordance with one or more aspects and features of the invention.

FIG. 2 is a schematic top view of the flash-drive apparatus of FIG. 1 in which the outer casing is omitted.

FIG. 3 is a schematic bottom view of the flash-drive apparatus of FIG. 1.

FIG. 4 is a schematic bottom view of the flash-drive apparatus of FIG. 1 in which the outer casing is omitted.

FIG. 7 is a schematic top view of another flash-drive apparatus in accordance with one or more aspects and features of the invention.

FIG. 8 is a schematic top view of the flash-drive apparatus of FIG. 7 in which the outer casing is omitted.

FIG. 9 is a schematic bottom view of the flash-drive apparatus of FIG. 7.

FIG. 10 is a schematic bottom view of the flash-drive apparatus of FIG. 7 in which the outer casing is omitted.

FIG. 11 is a schematic top view of another flash-drive apparatus in accordance with one or more aspects and features of the invention.

FIG. 12 is a schematic top view of the flash-drive apparatus of FIG. 11 in which the outer casing is omitted.

FIG. 13 is a schematic bottom view of the flash-drive apparatus of FIG. 11.

FIG. 14 is a schematic bottom view of the flash-drive apparatus of FIG. 11 in which the outer casing is omitted.

FIG. 23 is a schematic top view of another flash-drive apparatus in accordance with one or more aspects and features of the invention.

FIG. 24 is a schematic top view of the flash-drive apparatus of FIG. 23 in which the outer casing is omitted.

FIG. 25 is a schematic bottom view of the flash-drive apparatus of FIG. 23.

FIG. 26 is a schematic bottom view of the flash-drive apparatus of FIG. 23 in which the outer casing is omitted.

FIG. 27 is a schematic top view of another flash-drive apparatus in accordance with one or more aspects and features of the invention.

FIG. 28 is a schematic top view of the flash-drive apparatus of FIG. 27 in which the outer casing is omitted.

FIG. 29 is a schematic bottom view of the flash-drive apparatus of FIG. 27.

FIG. 30 is a schematic bottom view of the flash-drive apparatus of FIG. 27 in which the outer casing is omitted.

FIG. 31 is a schematic top view of another flash-drive apparatus in accordance with one or more aspects and features of the invention.

FIG. 32 is a schematic top view of the flash-drive apparatus of FIG. 31 in which the outer casing is omitted.

FIG. 33 is a schematic bottom view of the flash-drive apparatus of FIG. 31.

FIG. 34 is a schematic bottom view of the flash-drive apparatus of FIG. 31 in which the outer casing is omitted.

FIG. 35 is a schematic top view of another flash-drive apparatus in accordance with one or more aspects and features of the invention.

FIG. 36 is a schematic top view of the flash-drive apparatus of FIG. 35 in which the outer casing is omitted.

FIG. 37 is a schematic bottom view of the flash-drive apparatus of FIG. 35.

FIG. 38 is a schematic bottom view of the flash-drive apparatus of FIG. 35 in which the outer casing is omitted.

FIG. 39 is a schematic top view of another flash-drive apparatus in accordance with one or more aspects and features of the invention.

FIG. 40 is a schematic top view of the flash-drive apparatus of FIG. 39 in which the outer casing is omitted.

FIG. 41 is a schematic bottom view of the flash-drive apparatus of FIG. 39.

FIG. 42 is a schematic bottom view of the flash-drive apparatus of FIG. 39 in which the outer casing is omitted.

FIG. 43 is a schematic top view of another flash-drive apparatus in accordance with one or more aspects and features of the invention.

FIG. 44 is a schematic top view of the flash-drive apparatus of FIG. 43 in which the outer casing is omitted.

FIG. 45 is a schematic bottom view of the flash-drive apparatus of FIG. 43.

FIG. 46 is a schematic bottom view of the flash-drive apparatus of FIG. 43 in which the outer casing is omitted.

FIG. 47 is a schematic top view of another flash-drive apparatus in accordance with one or more aspects and features of the invention in which the outer casing is omitted.

FIG. 48 is a schematic top view of another flash-drive apparatus in accordance with one or more aspects and features of the invention in which the outer casing is omitted.

FIG. 49 is a schematic top view of another flash-drive apparatus in accordance with one or more aspects and features of the invention in which the outer casing is omitted.

FIG. 50 is a schematic top view of another flash-drive apparatus in accordance with one or more aspects and features of the invention in which the outer casing is omitted.

FIG. 51 is a schematic top view of another flash-drive apparatus in accordance with one or more aspects and features of the invention in which the outer casing is omitted.

FIG. 52 is a schematic top view of another flash-drive apparatus in accordance with one or more aspects and features of the invention in which the outer casing is omitted.

FIG. 53 is a schematic top view of another flash-drive apparatus in accordance with one or more aspects and features of the invention in which the outer casing is omitted.

FIG. 54 is a schematic top view of another flash-drive apparatus in accordance with one or more aspects and features of the invention in which the outer casing is omitted.

FIG. 55 is a schematic top view of another flash-drive apparatus in accordance with one or more aspects and features of the invention in which the outer casing is omitted.

FIG. 56 is a schematic top view of another flash-drive apparatus in accordance with one or more aspects and features of the invention in which the outer casing is omitted.

DETAILED DESCRIPTION

Figure 5:
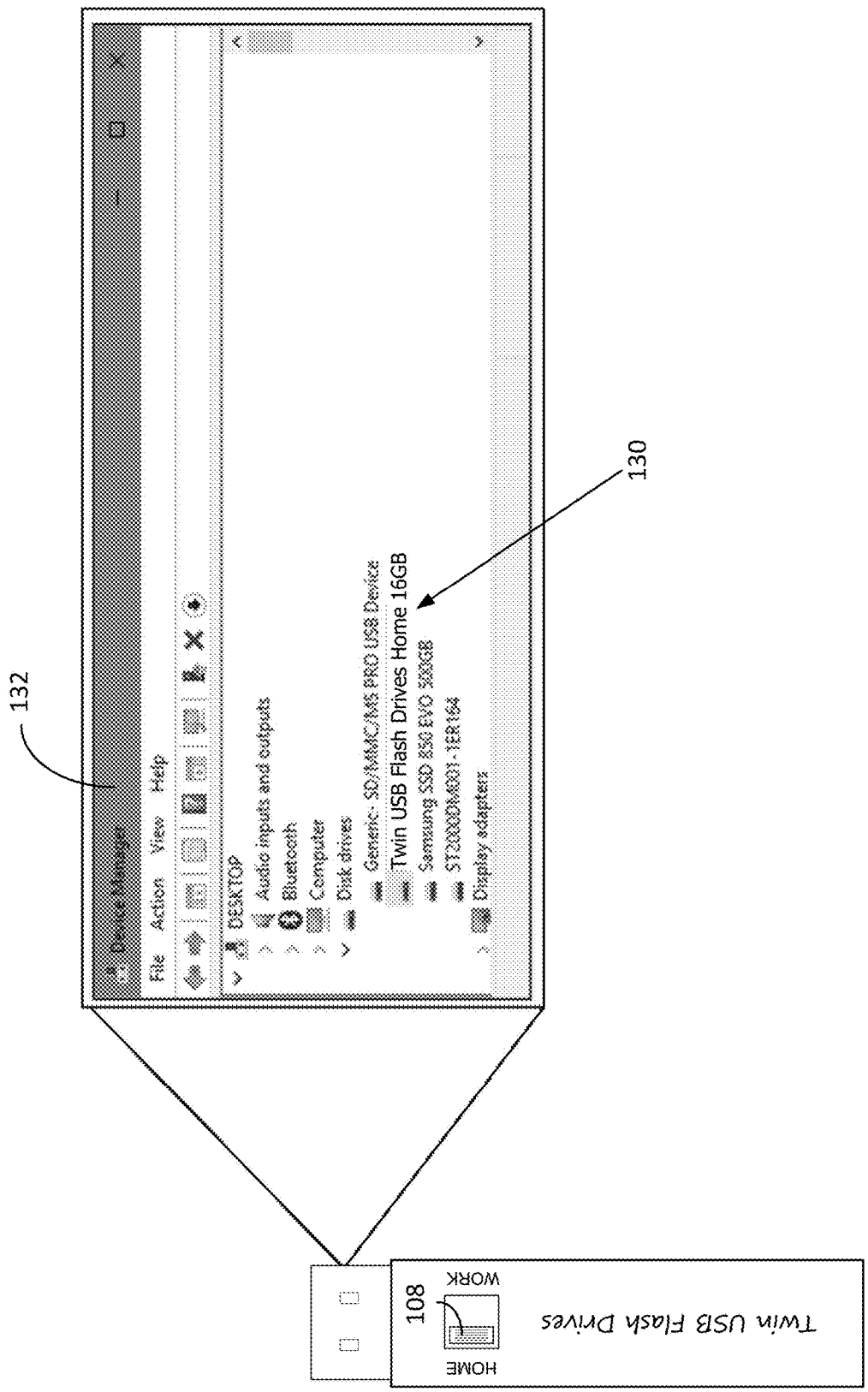
FIG. 5 is an illustration of the device manager of a Windows operating system that shows a "home" flash drive connected to the personal computing device.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive.

Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange.

Moreover, the phrase "one or more" followed by a list of items joined by "and" is the equivalent of "at least one" followed by the list of items joined by "and".

Additionally, "portable memory device" as used herein means a handheld device that comprises (a) non-volatile computer-readable memory for electronically storing non-transitory information such as, for example, data, computer files, software (i.e., computer-executable instructions), and combinations thereof; and (b) an interface through which a computing device (i.e., device having a processer, and hereinafter generally referred to as a "computer") that is external to the handheld device accesses the non-volatile computer-readable memory, i.e., reads information from, writes information to, or both reads information from and writes information to the non-volatile computer-readable memory. The interface may be, for example, a USB interface; or may be a wireless interface that utilizes WiFi or Bluetooth communication protocols, wherein the portable memory device comprises a wireless transmitter and wireless receiver (e.g., a transceiver). The portable memory device may comprise additional components, too, including a controller (e.g., a micro controller chip) programmed and configured to manage communications via the interface with an external device as well as manage the reading of data from and writing of data to the non-volatile computer-readable memory.

A "flash-drive apparatus" as used herein means a type of portable memory device in which the non-volatile computer-readable memory is flash memory. The memory technology of a flash-drive apparatus may be NOR flash or NAND flash—or a combination thereof, as desired by an Ordinary Artisan depending on the design specifications and intended use in a particular implementation. Moreover, the memory type of a flash-drive apparatus may be SLC (Single Level Cell); MLC (Multi Level Cell); or TLC (Triple Level Cell), as desired by the Ordinary Artisan again depending on the design specifications and intended use in a particular implementation. Dynamic wear leveling, static wear leveling, or both also may be implemented in a flash-drive apparatus in the controller of the portable memory device or in on or more flash-memory controllers. Moreover, a flash-drive apparatus of the prior art is believed to present and encompass a single flash drive and therefore may be called a "flash drive", "thumb drive", "jump drive", "pen drive", "gig stick", "flash stick", "memory stick", "USB flash drive", "USB drive', "USB stick", and "USB memory".

In accordance with one or more aspects and features of the present invention, and as used herein, a "flash-drive apparatus" further may encompass one or more flash drives depending on the particular embodiment. When multiple flash drives are encompassed within the flash-drive apparatus, then each flash drive is presented for use by an external device but only in a nonconcurrent manner. Thus, if more than one flash drive is encompassed by a flash-drive apparatus of the present invention then, in accordance with one or more aspects and features of the present invention, use of one of the flash drives is mutually exclusive of concurrent use of any other flash drive encompassed by the flash-drive apparatus; there can be only one flash drive presented for use at any given time.

A "mass storage device" as used herein means a device for storing data that is seen by a software operating system as a mass storage device when communicating through a USB interface. In preferred embodiments, the mass storage device is a USB mass storage device that is accessible to an operating system of a host computing device for file transfers between the host and the USB mass storage device. In especially preferred embodiments, the mass storage device is a USB mass storage device that is available to the file system of the operating system and that appears as a logical drive or part of a logical drive, or as a file share, for use by the file system in ready and writing files.

"Non-volatile electronic data storage" as used herein means a computing device as recognized by a software operating system to which data can be written and from which data can be read. In preferred embodiments in which an interface comprises a USB connector, non-volatile electronic data storage comprises a USB mass storage device. In other embodiments, the non-volatile electronic data storage may comprise, for example, a network share or connected network drive, especially in embodiments where the interface is wireless. In any variation, non-volatile electronic data storage as used herein comprises hardware in the form of non-volatile computer-readable memory for electronically storing information such as, for example, data, computer files, software (i.e., computer-executable instructions), and combinations thereof.

A "demux component" as used herein refers to an apparatus—which may be, for example, a component, application specific integrated circuit, chip, or physical switching mechanism—that is part of a portable memory device and that bridges a primary pathway to each of a plurality of secondary pathways for electronic communications through the demux component, the bridging of the primary pathway to any secondary pathway of the demux component being to the mutual exclusion of any bridging of the primary pathway to any other secondary pathway of the demux component.

By analogy, the demux component is similar in many respects to a demux, demultiplexer, or data distributor as such term or phrase is understood by the Ordinary Artisan in electrical engineering, but the meaning as used herein is not identical. Specifically, in accordance with one or more aspects and features of the present invention, the secondary pathway that is bridged is determined, for example, by one or more control signals (also called "select" signals); by manual manipulation of one or more physical control elements of the demux component, in which the bridging is effected directly by such manual manipulation; or by a combination control signals and manual manipulation of one or more physical control elements. The manual manipulation may be direct physical manipulation by hand, for example, of an arrangement of one or more slide switches, one or more thumb wheel switches, one or more toggle switches, and combinations thereof. In these respects, the demux component of the present invention is believed to be quite different from a demux, demultiplexer, or data distributor as understood by the Ordinary Artisan in electrical engineering.

Additionally, in some embodiments, one or more control signals may be provided to the demux component by a control group comprising one or more components of the portable memory device when the control group is located between the connector and the demux component in communication pathways of the portable memory device. In such embodiments, the control group determines the secondary pathway to be bridged with the primary pathway in the demux component by providing one or more control signals to the demux component based on an identification of an external device that is using the interface to read information from or write information to the portable memory device. For instance, when the connector comprises a USB connector, an identification of the external device is provided upon manually plugging the USB connector of the portable memory device into a USB port of the external device. The identification may identify a type, class, or manufacturer of the external device, or may uniquely identify the external device, such as by providing a computer name, user name, or both, and the control group determines the secondary pathway for bridging based on such identification.

As an example of this, in one implementation the portable memory device may be plugged into the USB port of a multifunction printer and, based on the identification of the external device as being a printer, a secondary pathway is identified by the control group for presenting first non-volatile electronic data storage for printing, scanning, or faxing of files by the multifunction printer, and the control group provides an appropriate control signal to the demux component. The same portable memory device may be plugged into the USB port of a vehicle and, based on the identification of the external device as an audio system, a different secondary pathway is identified by the control group for presenting second, different non-volatile electronic data storage containing audio files for saving or playing, and the control group provides an appropriate control signal to the demux component. The same portable memory device may be plugged into the USB port of a laptop, tablet, or desktop (hereinafter "personal computing device") and, based on the identification of the external device as a personal computing device, another different secondary pathway is identified by the control group for presenting yet third, different non-volatile electronic data storage for reading word processing files from and writing word processing files to the third non-volatile electronic data storage of the portable memory device, and the control group provides an appropriate control signal to the demux component.

In some additional embodiments, an arrangement of one or more physical control elements—whether forming part of the demux component or a separate user control—has a plurality of different configurations, with one or more certain configurations of the arrangement resulting in a first pathway being bridged for presenting first non-volatile electronic data storage, and other configurations resulting in a secondary pathway being bridged for presenting different, second non-volatile electronic data storage. It also is contemplated that no secondary pathway may be bridged in the demux component, resulting in no non-volatile electronic data storage being presented by the portable memory device; and it is contemplated that a secondary pathway leading nowhere, i.e., a "dead end", may be bridged in the demux component, thereby also resulting in no non-volatile electronic data storage being presented by the portable memory device. This may be implemented for security reasons when there is a large number of configurations and only one or a small number of configurations result in non-volatile electronic data storage being presented by the portable memory device. Thus, as a practical matter, the specific configuration or configurations in these additional embodiments must be known by a user in order to access particular non-volatile electronic data storage for reading, writing, or both.

Referring now to the drawings, one or more preferred embodiments of the invention are next described. The following description of one or more preferred embodiments is merely exemplary in nature and is in no way intended to limit the invention, its implementations, or uses.

Embodiments of the "Twin USB Flash-Drive Apparatus"

FIG. 1 is a schematic top view of a flash-drive apparatus 100 in accordance with one or more aspects and features of the invention. The flash-drive apparatus 100 includes an outer protective casing 102. FIG. 2 is a schematic top view of the flash-drive apparatus 100, wherein the outer protective casing 102 is omitted to reveal a top of a printed circuit board (PCB) 104 and contents of the flash-drive apparatus 100 that are attached to the top of the PCB 104. FIG. 3 is a schematic bottom view of the flash-drive apparatus 100, and FIG. 4 is a schematic bottom view of the flash-drive apparatus 100, wherein the protective outer casing 102 again is omitted to reveal a bottom of the PCB 104 and contents of the flash-drive apparatus 100 that are attached to the bottom of the PCB 104. The PCB 104 provides electronic communication pathways for and between the contents of the flash-drive apparatus 100 that are attached to the PCB 104.

As seen in FIG. 1, the flash-drive apparatus 100 comprises a USB connector 106. The flash-drive apparatus 100 further comprises a physical control element located on an exterior of the casing 102 in the form of a manually operated slide switch 108. Alternatively, the physical control element may be manually operated toggle switch or thumb wheel switch. More than one physical control element also may be located on the exterior of the casing 102.

As seen in FIG. 2, contents of the flash-drive apparatus 100 comprise an interface 110; a demux component 112; an oscillator component 114; two flash-memory storage components 116,118; and a controller 120.

The interface 110 is connected to the PCB 104 for enabling communications between the flash-drive apparatus 100 and an external device. The interface 110 may be a USB 2.0 interface or USB 3.0 interface and, in any event, preferably is backwards compatible.

The oscillator component 114 is connected to the PCB 104 for providing a clock signal and preferably comprises a crystal oscillator.

Each of the memory storage components 116,118 comprises non-volatile memory for reading, writing, and storing of data. Such non-volatile memory preferably comprises NAND flash memory.

As seen in FIG. 4, contents of the flash-drive apparatus 100 further comprise another oscillator component 122; two additional flash-memory storage components 124,126; and another controller 128. Each controller 120,128 preferably comprises a micro controller chip and preferably includes a USB controller for communications through the interface 110 including the USB connector 106. The controllers 120,128 or, alternatively, the mass storage components 116,118,124,126, also preferably comprise one or more flash-memory controllers and perform flash-translation-layer functions.

From FIGS. 2 and 4 it will be apparent that the casing 102 encloses and protects the PCB 104; interface 110; the demux component 112; oscillators 114,122; controllers 120,128; and flash-memory components 116,118,124,126. The connector 106 preferably extends from the casing 102 for plugging into a USB port and may or may not be retractable or otherwise protected by the casing 102 when not in use.

The flash-drive apparatus 100 comprises a plurality of mass storage device groups connected to the PCB 104. A first mass storage device group includes the oscillator component 114, controller 120, and flash-memory storage components 116,118, and the first mass storage device group manages both communications between the flash-drive apparatus 100 and an external device through the interface 110 and the reading of data from and writing of data to the flash-memory storage components 116,118. Similarly, a second mass storage device group includes the oscillator component 122, controller 128, and flash-memory storage components 124,126, and the second mass storage device group manages both communications between the flash-drive apparatus 100 and an external device through the interface 110 and the reading of data from and writing of data to the flash-memory storage components 124,126. The demux component 112 is connected to the PCB 104 and is configured to connect the interface 110 with each mass storage device group in a manner that is mutually exclusive of each other. Thus, only one mass storage device group is connected with the interface 110 at a time; two or more mass storage device groups are not simultaneously connected with the interface 110. Furthermore, the first mass storage device group provides a first mass storage device when the interface 110 is connected therewith by the demux component 112, by which first mass storage device an external device uses the flash-drive apparatus 100. The second mass storage device groups provides a second, different mass storage device when the interface 110 is connected therewith by the demux component 112, by which second, different mass storage device an external device uses the flash-drive apparatus 100. The provision of the first mass storage device for use by an external device is mutually exclusive of the provision of the second, different mass storage device for use by an external device.

In the flash-drive apparatus 100, each mass storage device group comprises a respective oscillator component that is used therewith when such mass storage device group is connected by the demux component 112 with the interface 110. Alternatively, an oscillator component is provided that is located between the interface 110 and the demux component 112 and it is the only oscillator component of the flash-drive apparatus 100. In such instances, the oscillator component is used in conjunction with each mass storage device group when such mass storage device group is connected by the demux component 112 with the interface 110.

With further regard to the flash-drive apparatus 100, a mutually exclusive connection of the interface 110 with one of the mass storage device groups is made based on manual manipulation of one or more physical control elements of the flash-drive apparatus 100 and, in particular, the slide switch 108 which forms part of the demux component 112.

Thus, with reference to FIG. 5, when the flash-drive apparatus 100 is plugged into a USB port of a personal computing device with the slide switch 108 in the "HOME" position or configuration, a mass storage device labeled "Twin USB Flash drive apparatus Home 16 GB" is seen by the host operating system of the personal computing device as illustrated, for example, at 130 in the device manager window 132.

Figure 6:
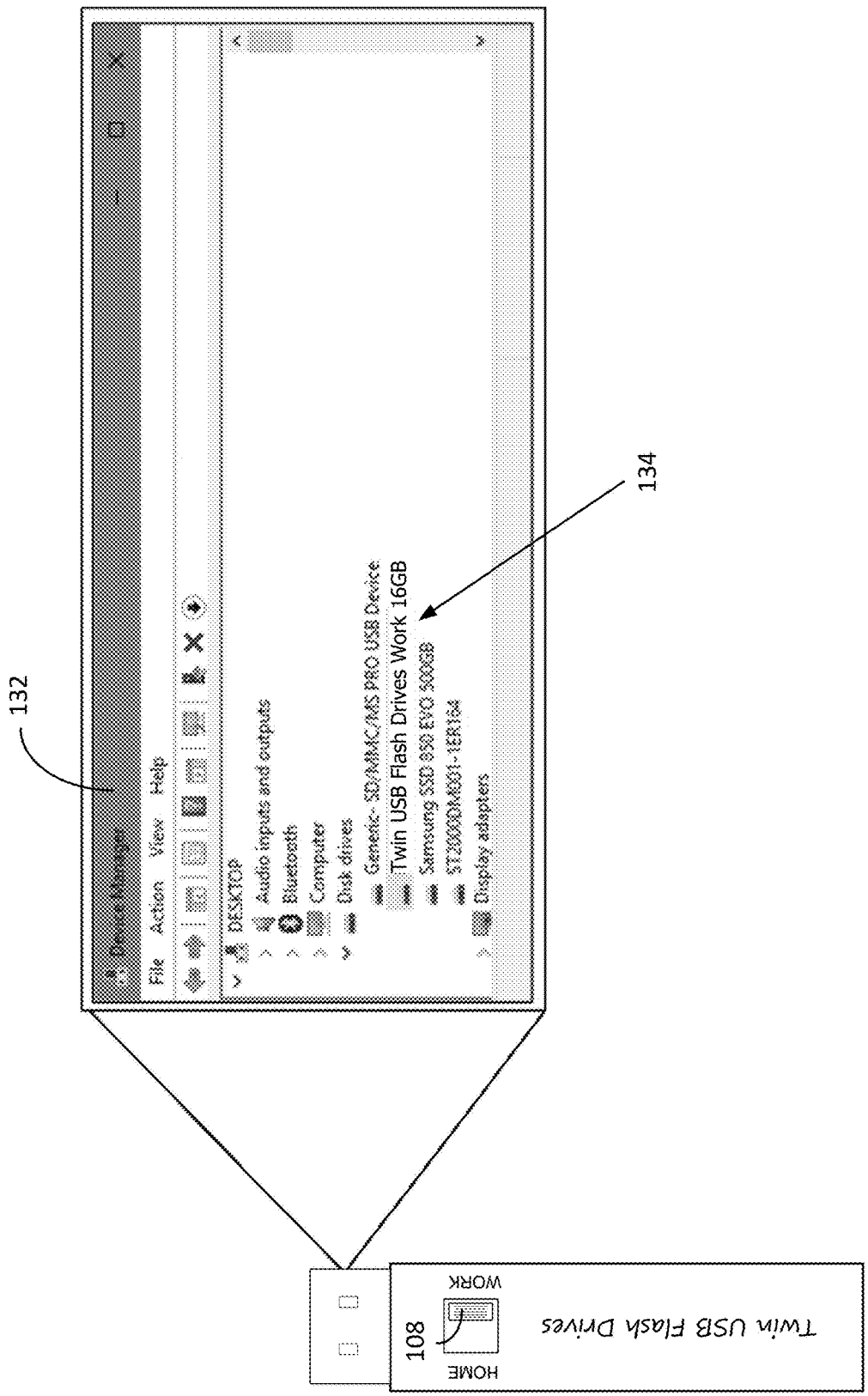
FIG. 6 is an illustration of the device manager of the Windows operating system that shows a "work" flash drive that is alternatively connected to the personal computing device.

With reference to FIG. 6, when the flash-drive apparatus 100 is plugged into a USB port of a personal computing device with the slide switch 108 in the "WORK" position or configuration, a mass storage device labeled "Twin USB Flash drive apparatus Work 16 GB" is seen by the host operating system of the personal computing device as illustrated, for example, at 134 in the device manager window 132. The flash-drive apparatus thus provides a "home" flash-drive apparatus for personal use that is separate and distinct from a "work" flash-drive apparatus for business use. Either is alternatively connected to a personal computing device for access, but neither can be connected for use simultaneously by manually transitioning the slide switch 108 by a user from "HOME" to "WORK". The "home" and "work" flash-drive apparatus are separate from each other even though contained within the same casing 102, thereby better enabling separation of work files from personal files while increasing convenience of not having to keep up physically with two separate flash-drive apparatus. From one perspective, the flash-drive apparatus 100 thereby provides twin USB flash-drive apparatus for individual, non-concurrent use.

In at least some embodiments, a mutually exclusive connection of the interface 110 with one of the mass storage device groups is made based on manual manipulation of one or more physical control elements of the flash-drive apparatus 100. This preferably is accomplished, for example, by bridging an electronic pathway in the demux component 112 in order to enable current flow or voltage therethrough and, in some scenarios, correspondingly breaking another electronic pathway to disable current flow or voltage therethrough. This is preferably accomplished by incorporating the physical slide switch 108 into the demux component 112 of the flash-drive apparatus 100, as illustrated in FIG. 2. It further will be appreciated that a pathway between two components connected to the PCB 104 may comprise a single line or a plurality of lines schematically shown on the PCB 104.

In a variation, one or more control signals are provided to the demux component 112 by which the appropriate connection to be made is determined. This is illustrated with reference to flash-drive apparatus 136 of FIGS. 7-10, wherein reference numbers for the same or similar elements are used as between the flash-drive apparatus 100 of FIGS. 1-6 and the flash-drive apparatus 136 of FIGS. 7-10. In this regard, FIG. 7 is a schematic top view of the flash-drive apparatus 136; FIG. 8 is a schematic top view of the flash-drive apparatus 136 in which the outer casing 102 is omitted; FIG. 9 is a schematic bottom view of the flash-drive apparatus 136; and FIG. 10 is a schematic bottom view of the flash-drive apparatus 136 in which the outer casing 102 is omitted. As seen in FIGS. 7-10, the physical slide switch 108 is located on a back of the flash-drive apparatus 136 and forms part of switch component 138. The switch component 138 further provides a control signal to the demux component 112 based on the state of the physical slide switch 108. The user experience in operation and use of the flash-drive apparatus 136 remains the same as that of the flash-drive apparatus 100.

In another variation, an oscillator component 142 and controller group comprising controller 144 are located between the interface 110 and the demux component 112 as seen, for example, in the flash-drive apparatus 140 of FIGS. 11-14. In this regard, FIG. 11 is a schematic top view of the flash-drive apparatus 140; FIG. 12 is a schematic top view of the flash-drive apparatus 140 in which the outer casing 102 is omitted; FIG. 13 is a schematic bottom view of the flash-drive apparatus 140; and FIG. 14 is a schematic bottom view of the flash-drive apparatus 140 in which the outer casing 102 is omitted. The controller group is connected to the PCB 104 and manages both communications between the flash-drive apparatus 140 and an external device through the interface 110, and reading of data from and writing of data to one or more of the memory storage components 116,118,124,126. These memory storage components preferably comprise NAND flash memory. As in the flash-drive apparatus 100, the slide switch 108 is integrated into the demux component 112 of the flash-drive apparatus 140.

Additionally, in the flash-drive apparatus 140, the memory storage components 116,118 form a first memory storage group and the memory storage components 124,126 form a second memory storage group, and the demux component 112 is configured to connect the controller group with each memory storage group, wherein the connections of the controller group with the memory storage groups are mutually exclusive of each other. Each memory storage group preferably comprises a flash-memory controller and performs flash-translation-layer functions; alternatively, the controller group comprises a flash-memory controller and performs flash-translation-layer functions. A first mass storage device is provided when the controller group is connected with the first memory storage group by the demux component 112, by which first mass storage device an external device uses the flash-drive apparatus 140; similarly, a second, different mass storage device is provided when the controller group is connected with the second, different memory storage group by the demux component 112, by which second, different mass storage device an external device uses the flash-drive apparatus 140. Furthermore, the provision of the first mass storage device for use by an external device is mutually exclusive of the provision of the second, different mass storage device for use by an external device.

The user experience in operation and use of the flash-drive apparatus 140 preferably is the same as that of the flash-drive apparatus 136.

Figure 18:
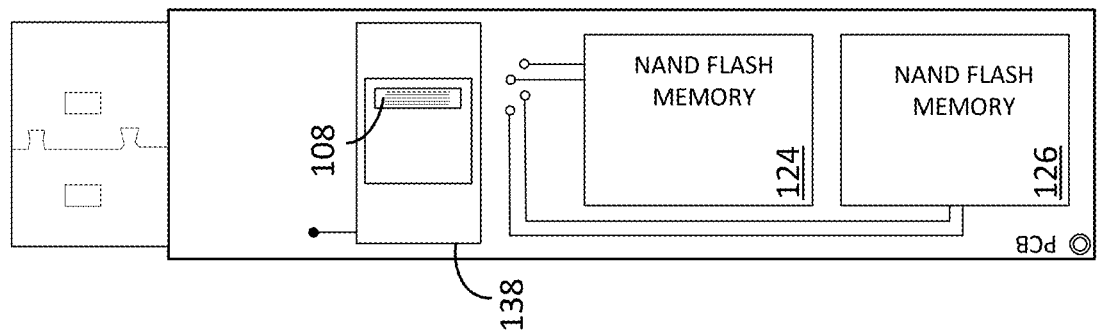
FIG. 18 is a schematic bottom view of the flash-drive apparatus of FIG. 15 in which the outer casing is omitted.
Figure 17:
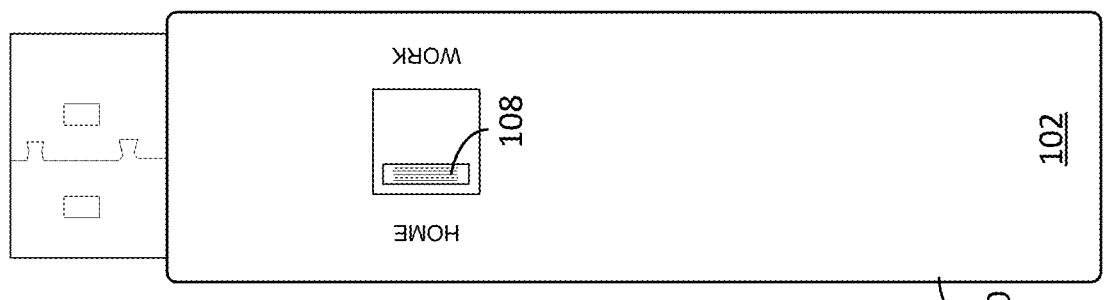
FIG. 17 is a schematic bottom view of the flash-drive apparatus of FIG. 15.
Figure 16:
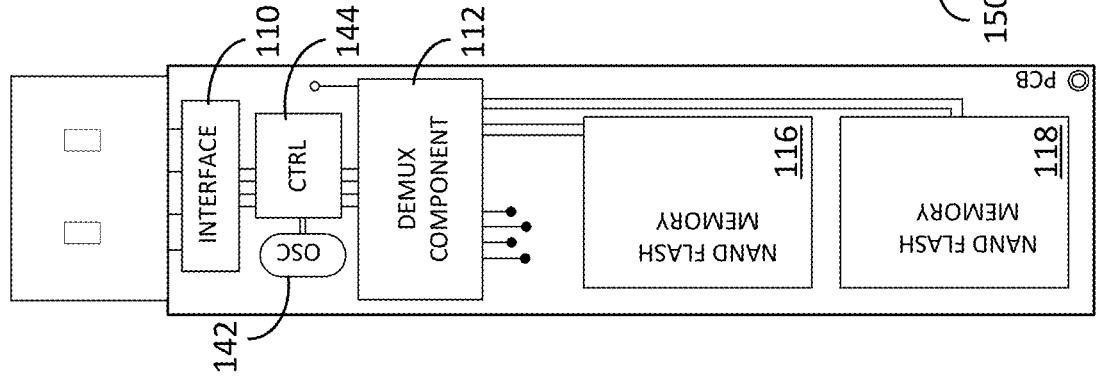
FIG. 16 is a schematic top view of the flash-drive apparatus of FIG. 15 in which the outer casing is omitted.
Figure 15:
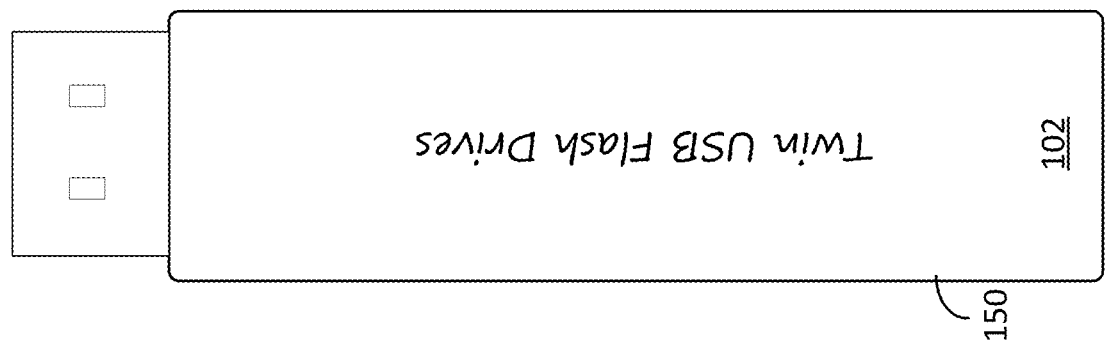
FIG. 15 is a schematic top view of another flash-drive apparatus in accordance with one or more aspects and features of the invention.

Alternatively, rather than have the slide switch 108 incorporated into the demux component 112 in the flash-drive apparatus 140, one or more control signals are provided to the demux component 112 by which the appropriate connection to be made is determined. This is illustrated with reference to flash-drive apparatus 150 of FIGS. 15-18, wherein reference numbers for the same or similar elements are used as between the flash-drive apparatus 140 of FIGS. 11-14 and the flash-drive apparatus 150 of FIGS. 15-18. In this regard, FIG. 15 is a schematic top view of the flash-drive apparatus 150; FIG. 16 is a schematic top view of the flash-drive apparatus 150 in which the outer casing 102 is omitted; FIG. 17 is a schematic bottom view of the flash-drive apparatus 150; and FIG. 18 is a schematic bottom view of the flash-drive apparatus 150 in which the outer casing 102 is omitted. As seen in FIGS. 15-18, the physical slide switch 108 is located on a back of the flash-drive apparatus 150 and forms part of switch component 138. The switch component 138 further provides a control signal to the demux component 112 based on the state of the physical slide switch 108. The user experience in operation and use of the flash-drive apparatus 150 remains the same as that of the flash-drive apparatus 140.

While the interface 110 has been described for use in USB communications, the interface additionally or alternatively comprises a wireless transmitter and a wireless receiver for wireless communications. A flash-drive apparatus 160 similar to flash-drive apparatus 100 but having wireless interface 198 in lieu of the interface 110 is illustrated, as an example, in FIG. 47; a flash-drive apparatus 170 similar to flash-drive apparatus 136 but having wireless interface 198 in lieu of the interface 110 is illustrated, as an example, in FIG. 48; a flash-drive apparatus 180 similar to flash-drive apparatus 140 but having wireless interface 198 in lieu of the interface 110 is illustrated, as an example, in FIG. 49; and, a flash-drive apparatus 190 similar to flash-drive apparatus 150 but having wireless interface 198 in lieu of the interface 110 is illustrated, as an example, in FIG. 50. The wireless interface 198 of each of these flash-drive apparatus of FIGS. 47-50 preferably is configured for WiFi communications, Bluetooth communications, or both types of communications. In such wireless implementations, a mass storage device may or may not be presented. Instead, a network share or network connected drive may be presented. In any case, no more than one memory storage group or mass storage device group is connected with the interface at any given time.

Embodiments of the "Public/Private USB Flash-Drive Apparatus"

Figure 22:
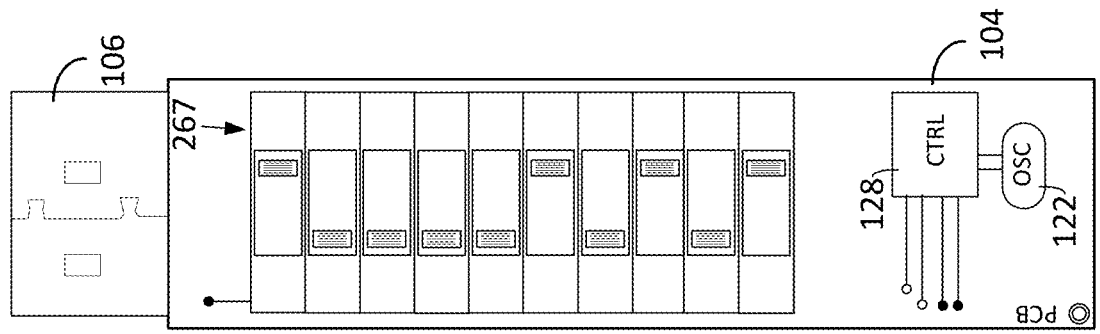
FIG. 22 is a schematic bottom view of the flash-drive apparatus of FIG. 19 in which the outer casing is omitted.
Figure 21:
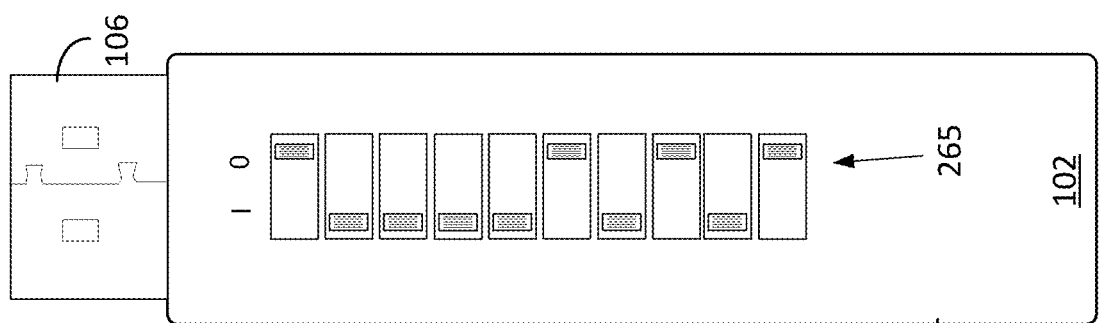
FIG. 21 is a schematic bottom view of the flash-drive apparatus of FIG. 19.
Figure 20:
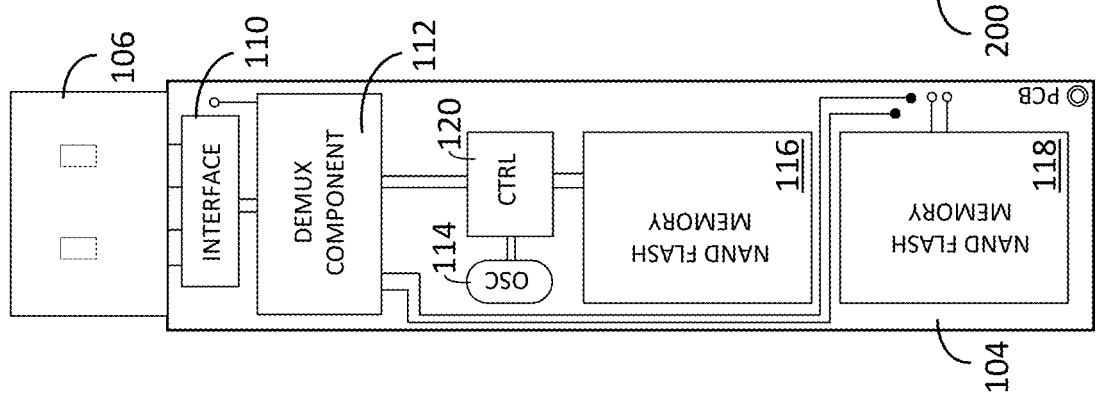
FIG. 20 is a schematic top view of the flash-drive apparatus of FIG. 19 in which the outer casing is omitted.
Figure 19:
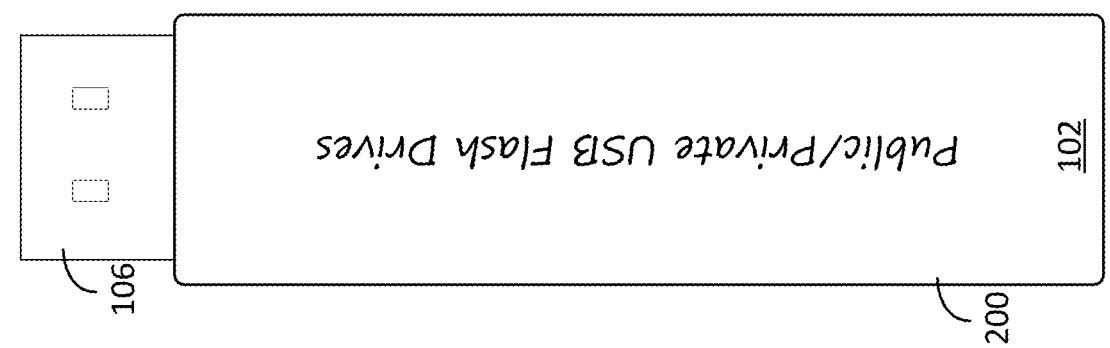
FIG. 19 is a schematic top view of another flash-drive apparatus in accordance with one or more aspects and features of the invention.

FIG. 19 is a schematic top view of a flash-drive apparatus 200 in accordance with one or more aspects and features of the invention. The flash-drive apparatus 200 includes an outer protective casing 102. FIG. 20 is a schematic top view of the flash-drive apparatus 200, wherein the outer protective casing 102 is omitted to reveal a top of a printed circuit board (PCB) 104 and contents of the flash-drive apparatus 200 that are attached to the top of the PCB 104. FIG. 21 is a schematic bottom view of the flash-drive apparatus 200, and FIG. 22 is a schematic bottom view of the flash-drive apparatus 200, wherein the protective outer casing 102 again is omitted to reveal a bottom of the PCB 104 and contents of the flash-drive apparatus 200 that are attached to the bottom of the PCB 104. The PCB 104 provides electronic communication pathways for and between the contents of the flash-drive apparatus 200 that are attached to the PCB 104. A pathway between two components may comprise a single line or a plurality of lines schematically shown on the PCB 104. The flash-drive apparatus 200 comprises a USB connector 106.

As seen in FIG. 20, contents of the flash-drive apparatus 200 comprise an interface 110; a demux component 112; an oscillator component 114; two flash-memory storage components 116,118; and a controller 120.

The interface 110 is connected to the PCB 104 for enabling communications between the flash-drive apparatus 200 and an external device. The interface 110 may be a USB 2.0 interface or USB 3.0 interface and, in any event, preferably is backwards compatible.

The oscillator component 114 is connected to the PCB 104 for providing a clock signal and preferably comprises a crystal oscillator.

Each of the memory storage components 116,118 comprises non-volatile memory for reading, writing, and storing of data. Such non-volatile memory preferably comprises NAND flash memory.

As seen in FIG. 22, contents of the flash-drive apparatus 200 further comprise another oscillator component 122 and another controller 128. Each controller 120,128 preferably comprises a micro controller chip and preferably includes a USB controller for communications through the interface 110 including the USB connector 106. The controllers 120,128 or, alternatively, the mass storage components 116,118, also preferably comprise one or more flash-memory controllers and perform flash-translation-layer functions.

From FIGS. 20 and 22 it will be apparent that the casing 102 encloses and protects the PCB 104; interface 110; the demux component 112; oscillators 114,122; controllers 120, 128; and flash-memory components 116,118.

The connector 106 preferably extends from the casing 102 for plugging into a USB port and may or may not be retractable or otherwise protected by the casing 102 when not in use.

The flash-drive apparatus 200 comprises a plurality of mass storage device groups connected to the PCB 104. A first mass storage device group includes the oscillator component 114, controller 120, and flash-memory storage component 116, and the first mass storage device group manages both communications between the flash-drive apparatus 200 and an external device through the interface 110 and the reading of data from and writing of data to the flash-memory storage component 116. Similarly, a second mass storage device group includes the oscillator component 122, controller 128, and flash-memory storage component 124, and the second mass storage device group manages both communications between the flash-drive apparatus 200 and an external device through the interface 110 and the reading of data from and writing of data to the flash-memory storage component 124. The demux component 112 is connected to the PCB 104 and is configured to connect the interface 110 with each mass storage device group in a manner that is mutually exclusive of each other. Thus, only one mass storage device group is connected with the interface 110 at a time; two or more mass storage device groups are not simultaneously connected with the interface 110. Furthermore, the first mass storage device group provides a first mass storage device when the interface 110 is connected therewith by the demux component 112, by which first mass storage device an external device uses the flash-drive apparatus 200. The second mass storage device groups provides a second, different mass storage device when the interface 110 is connected therewith by the demux component 112, by which second, different mass storage device an external device uses the flash-drive apparatus 200. The provision of the first mass storage device for use by an external device is mutually exclusive of the provision of the second, different mass storage device for use by an external device.

In the flash-drive apparatus 200, each mass storage device group comprises a respective oscillator component that is used therewith when such mass storage device group is connected by the demux component 112 with the interface 110. Alternatively, an oscillator component is provided that is located between the interface 110 and the demux component 112 and it is the only oscillator component of the flash-drive apparatus 200. In such instances, the oscillator component is used in conjunction with each mass storage device group when such mass storage device group is connected by the demux component 112 with the interface 110.

With further regard to the flash-drive apparatus 200, a mutually exclusive connection of the interface 110 with one of the mass storage device groups is made based on a control signal that is received from manual manipulation of an arrangement of physical control elements of the flash-drive apparatus 200 and, preferably, from an arrangement of manually operated toggle switches 265 that are located on the exterior of the casing 102, which toggle switches 265 are part of the arrangement of ten toggle switch components 267 seen in FIG. 22 connected to PCB 104. Each toggle switch is transitionable between "1" and "0" and, thus, the arrangement has 2^10 or 1024 possible configurations.

Preferably, in one of these configurations, the control signal causes the demux component 112 to connect the interface 110 with the first mass storage device group. In all other configurations, the control signal causes the demux component 112 to connect the interface 110 with the second mass storage device group. Accordingly, unless a user knows the specific configuration for causing the demux component 112 to connect the interface 110 with the first mass storage device group, the chances are very likely (1 in 1024) that the demux component 112 will connect the interface 110 with the second mass storage device group for providing the second mass storage device. Because of this, the flash-drive apparatus 200 is considered to be "public" when the arrangement is not in the specific configuration, and the flash-drive apparatus is considered to be "private" when the arrangement is in the specific configuration. The owner of the flash-drive apparatus 200 need only maintain the arrangement in the specific configuration for his or her use and change the configuration when temporary lending the flash-drive apparatus for use by another. In this way, it will be rare when someone will accidentally access any files of the owner on the "private" flash-drive apparatus.

It will be appreciated that the arrangement of switch components 267 constitutes an example of a manually operated control that is transitionable to a first configuration for effecting coupling of the interface to the first group of components to the exclusion of coupling of the interface to the second group of components, and to a second configuration for effecting coupling of the interface to the second group of components to the exclusion of coupling of the interface to the first group of components. Moreover, in this example, when the manually operated control is in the first configuration, the first group of components are coupled to the interface and provide the first mass storage device for use by an external device; and when the manually operated control is in the second configuration, the second group of components are coupled to the interface and provide the second mass storage device for use by an external device.

Additionally, it will be appreciated that the arrangement of switch components 267 constitutes an example of a manually operated control that is transitionable to different configurations for effecting coupling of the first group of components to the interface to the exclusion of coupling of the second group of components to the interface, and for effecting coupling of the second group of components to the interface to the exclusion of coupling of the first group of components to the interface. Moreover, in this further example, when the manually operated control is in a first configuration, the first group of components are coupled to the interface of the portable memory device and provide the first mass storage device for use by an external device through the interface; and when the manually operated control is not in the first configuration, the second group of components are coupled to the interface of the portable memory device and provide the second mass storage device for use by an external device through the interface.

It further will be appreciated that the arrangement of switch components 267 constitutes an example of a manually operated control transitionable to different configurations for effecting coupling and decoupling of the interface with a group of components connected to the board and arranged to provide a certain mass storage device when coupled to the interface. Moreover, in this further example, when the manually operated control is in a certain configuration of the different configurations, the group of components and the interface are coupled and provide the certain mass storage device for use by an external device through the interface; and when the manually operated control is not in the certain configuration, the group of components and the interface are decoupled and the certain mass storage device is not provided for use by an external device through the interface.

In a variation, the demux component incorporates the arrangement of switch components 267, or a plurality of demux components each including one or more switches are arranged in a nested order (with a connection leading to a group of components and with another connection leading to a subsequent demux component). In this way, bridging of pathways within a demux component for making a connection is effected directly by manual manipulation of a physical control element of the demux component (such as found, for example, in flash-drive apparatus 100,140 discussed above). It is believed that such bridging by physical manipulation reduces vulnerability to software hacking of the demux component in making the appropriate connections. When the appropriate connection that is made is based on a control signal that is received, the programming may be altered such that the wrong connection is made; when the appropriate connection is made based on the physical manipulation of switches that bridge pathways, software preferably is not utilized in making such determination.

In another variation, an oscillator component 142 and controller group comprising controller 144 are located between the interface 110 and the demux component 112 as seen, for example, in the flash-drive apparatus 240 of FIGS. 23-26. In this regard, FIG. 23 is a schematic top view of the flash-drive apparatus 240; FIG. 24 is a schematic top view of the flash-drive apparatus 240 in which the outer casing 102 is omitted; FIG. 25 is a schematic bottom view of the flash-drive apparatus 240; and FIG. 26 is a schematic bottom view of the flash-drive apparatus 240 in which the outer casing 102 is omitted. The controller group is connected to the PCB 104 and manages both communications between the flash-drive apparatus 240 and an external device through the interface 110, and reading of data from and writing of data to one or more of the memory storage components 116,118. These memory storage components preferably comprise NAND flash memory.

Additionally, in the flash-drive apparatus 240, the memory storage component 116 forms a first memory storage group and the memory storage component 118 forms a second memory storage group. The demux component 112 is configured to connect the controller group with each memory storage group, wherein the connections of the controller group with the memory storage groups are mutually exclusive of each other. Each memory storage group preferably comprises a flash-memory controller and performs flash-translation-layer functions; alternatively, the controller group comprises a flash-memory controller and performs flash-translation-layer functions.

A first mass storage device is provided when the controller group is connected with the first memory storage group by the demux component 112, by which first mass storage device an external device uses the flash-drive apparatus 240; similarly, a second, different mass storage device is provided when the controller group is connected with the second, different memory storage group by the demux component 112, by which second, different mass storage device an external device uses the flash-drive apparatus 240. Furthermore, the provision of the first mass storage device for use by an external device is mutually exclusive of the provision of the second, different mass storage device for use by an external device.

The user experience in operation and use of the flash-drive apparatus 240 preferably is the same as that of the flash drive 200.

In a variation of the flash-drive apparatus 240, the demux component incorporates the arrangement of switch components 267, or a plurality of demux components each including one or more switches are arranged in a nested order (with a connection leading to a group of components and with another connection leading to a subsequent demux component). In this way, bridging of pathways within a demux component for making a connection is effected directly by manual manipulation of a physical control element of the demux component (such as found, for example, in flash-drive apparatus 100,140 discussed above). It is believed that such bridging by physical manipulation reduces vulnerability to software hacking of the demux component in making the appropriate connections. When the appropriate connection that is made is based on a control signal that is received, the programming may be altered such that the wrong connection is made; when the appropriate connection is made based on the physical manipulation of switches that bridge pathways, software preferably is not utilized in making such determination.

In another variation, flash drive 250 is the same as flash drive 240 with the exception of the arrangement of toggle switches being replaced by thumb wheel switches 275 of an arrangement of switch components 277 that resemble a multiple-dial combination lock. Each thumb wheel switch of the arrangement 275 may have contact pins or areas on the top and the bottom corresponding to each number on the wheel, but only one for each dial has an electrical connection between such pins or areas. A simple circuit connects each dial in series, such that only when each dial is in the correct position will the entire circuit be complete. This arrangement 277 exemplifies the fact that switches of different form factors can be used in accordance with one or more aspects and features of the invention.

It is furthermore noted that the flash drive 250, each thumb wheel has ten possible configurations, with the arrangement of three thumb wheel switches having 10^3 or 1000 possible configurations. Additional thumb wheel switches can be utilized. Thus, if seven thumb wheel switches are utilized, then the arrangement will have 10^6 or 1,000,000 possible configurations. The odds of a person borrowing the flash drive 250 and accessing the "private" flash drive thus would be one in a million; an owner lending the flash drive 250 only need change one toggle switch to transition from the specific configuration and invoke such protection of the flash drive 250.

In a variation of the flash drive 250, the demux component incorporates the arrangement of switch components 277, or a plurality of demux components each including one or more switches are arranged in a nested order (with a connection leading to a group of components and with another connection leading to a subsequent demux component). In this way, bridging of pathways within a demux component for making a connection is effected directly by manual manipulation of a physical control element of the demux component (such as found, for example, in flash drives 100,140 discussed above). It is believed that such bridging by physical manipulation reduces vulnerability to software hacking of the demux component in making the appropriate connections. When the appropriate connection that is made is based on a control signal that is received, the programming may be altered such that the wrong connection is made; when the appropriate connection is made based on the physical manipulation of switches that bridge pathways, software preferably is not utilized in making such determination.

While the interface 110 has been described for use in USB communications, the interface additionally or alternatively may comprise a wireless transmitter and a wireless receiver for wireless communications. A flash drive 260 similar to flash drive 200 but having wireless interface 198 in lieu of the interface 110 is illustrated, as an example, in FIG. 51; and a flash drive 270 similar to each of flash drives 240,250 but having wireless interface 198 in lieu of the interface 110 is illustrated, as an example, in FIG. 52. The wireless interface 198 of each of these flash drives of FIGS. 51-52 preferably is configured for WiFi communications, Bluetooth communications, or both types of communications. In such wireless implementations, a mass storage device may or may not be presented. Instead, a network share or network connected drive may be presented. In any case, no more than one memory storage group or mass storage device group is connected with the interface at any given time.

Embodiments of the "Protected USB Flash Drive"

Flash drive 300 of FIGS. 31-34 is similar to flash drive 200 of FIGS. 19-22 and, therefore, the primary differences between these two flash drives now will be the focus of the description. In this regard, FIG. 31 is a schematic top view of the flash drive 300; FIG. 32 is a schematic top view of the flash drive 300 in which the outer casing 102 is omitted; FIG. 33 is a schematic bottom view of the flash drive 300; and FIG. 34 is a schematic bottom view of the flash drive 300 in which the outer casing 102 is omitted.

One difference in the flash drive 300 over the flash drive 200 is that flash drive 300 comprises a single mass storage device group rather than a plurality of mass storage device groups. This sole mass storage device group—comprising oscillator component 114, controller 122, and memory storage components 116,118—preferably is connected with the interface 110 only upon a specific configuration of toggle switches 265 of the arrangement of the toggle switch components 267 connected to the PCB 104. The arrangement being in the specific configuration is indicated by control signal to the demux component 112, which cause the demux component 112 to connect the interface 110 with the mass storage device group. In all other configurations of the arrangement, the control signal preferably causes the demux component 112 to connect the interface 110 with a "dead end" that does not include any mass storage device group. Such a dead end is schematically indicated at 273 in FIG. 32 by termination of the lines of pathway with X's.

The arrangement of toggle switch components 267 shown in FIG. 38 has 2^10 or 1024 possible configurations based on each toggle switch being manually transitionable between a "1" and "0" state. Accordingly, there is a small probability that any configuration randomly set will be the specific configuration of the arrangement that is required for use of the flash drive 300, and the flash drive 300 thereby is protected from use by someone who does not know the specific configuration.

It will be appreciated that the arrangement of switch components 267 in the flash drive 300 constitutes an example of a manually operated control transitionable to different configurations for effecting coupling and decoupling of the interface with a group of components connected to the board and arranged to provide a mass storage device when so coupled. Moreover, when the manually operated control is in a use configuration, the group of components and the interface are coupled and provide the mass storage device of the portable memory device for use by an external device through the interface; and when the manually operated control is not in the use configuration, the group of components and the interface are decoupled and no mass storage device of the portable memory device is provided for use by an external device through the interface.

In a variation, of the flash drive 300, the demux component incorporates the arrangement of switch components 267. In this respect, bridging of pathways within the demux component for making a live connection is effected directly by manual manipulation of the switches of the demux component. It is believed that such bridging by physical manipulation reduces vulnerability to software hacking of the demux component in making the appropriate connections. When the appropriate connection that is made is based on a control signal that is received, the programming may be altered such that the wrong connection is made; when the appropriate connection is made based on the physical manipulation of switches of the demux component, software preferably is not utilized in making such determination.

In another variation, an oscillator component 142 and controller group comprising controller 144 are located between the interface 110 and the demux component 112 as seen, for example, in the flash drive 340 of FIGS. 35-38. In this regard, FIG. 35 is a schematic top view of the flash drive 340; FIG. 36 is a schematic top view of the flash drive 340 in which the outer casing 102 is omitted; FIG. 37 is a schematic bottom view of the flash drive 340; and FIG. 38 is a schematic bottom view of the flash drive 340 in which the outer casing 102 is omitted. The controller group is connected to the PCB 104 and manages both communications between the flash drive 340 and an external device through the interface 110, and reading of data from and writing of data to one or more of the memory storage components 116,118. These memory storage components preferably comprise NAND flash memory.

The flash drive 340 comprises a single memory storage group—comprising memory storage components 116,118, which preferably is connected with the interface 110 only upon a specific configuration of toggle switches 265 of the arrangement of the toggle switch components 267 connected to the PCB 104. The arrangement being in the specific configuration is indicated by control signal to the demux component 112, which cause the demux component 112 to connect the interface 110 with the sole memory storage group. In all other configurations of the arrangement, the control signal preferably causes the demux component 112 to connect the interface 110 with a "dead end" that does not include any memory storage group. Such a dead end is schematically indicated at 273 in FIG. 36 by termination of the lines of a pathway with X's. Like flash drive 300, flash drive 340 is protected from use by someone who does not know the specific configuration because there is a small probability (1 in 1,024) at any configuration randomly set will be the specific configuration of the arrangement that is required for use of the flash drive 340.

Of course, it will be appreciated that the demux component 112 disconnects the interface 110 from either the mass storage device group (in flash drive 300) or the memory storage group (in flash drive 340) when the respective specific configuration of the arrangement of switch component 267 has not been set, whether or not the demux component 112 actually connects the interface with a "dead end" pathway. Simply disconnecting the interface from the "live" connection with the mass storage device group (in flash drive 300) or the memory storage group (in flash drive 340) is sufficient when the specific configuration has not been set.

In a variation, of the flash drive 340, the demux component incorporates the arrangement of switch components 267. In this respect, bridging of pathways within the demux component for making a live connection is effected directly by manual manipulation of the switches of the demux component. It is believed that such bridging by physical manipulation reduces vulnerability to software hacking of the demux component in making the appropriate connections. When the appropriate connection that is made is based on a control signal that is received, the programming may be altered such that the wrong connection is made; when the appropriate connection is made based on the physical manipulation of switches of the demux component, software preferably is not utilized in making such determination.

While the interface 110 has been described for use in USB communications, the interface additionally or alternatively may comprise a wireless transmitter and a wireless receiver for wireless communications. A flash drive 360 similar to flash drive 300 but having wireless interface 198 in lieu of the interface 110 is illustrated, as an example, in FIG. 53; and, a flash drive 370 similar to each of flash drive 340 but having wireless interface 198 in lieu of the interface 110 is illustrated, as an example, in FIG. 54. The wireless interface 198 of each of these flash drives of FIGS. 53-54 preferably is configured for WiFi communications, Bluetooth communications, or both types of communications. In such wireless implementations, a mass storage device may or may not be presented. Instead, a network share or network connected drive may be presented. In any case, no more than one memory storage group or mass storage device group is connected with the interface at any given time.

Embodiments of the "Specific Purpose Flash Drives"

Flash drive 400 of FIGS. 39-42 is considered to comprise "specific purpose" flash drives because the specific use of the flash drive 400 depends upon the external device with which the flash drive 400 is connected. In this regard, FIG. 39 is a schematic top view of the flash drive 400; FIG. 40 is a schematic top view of the flash drive 400 in which the outer casing 102 is omitted; FIG. 41 is a schematic bottom view of the flash drive 400; and FIG. 42 is a schematic bottom view of the flash drive 400 in which the outer casing 102 is omitted. Flash drive 400 of FIGS. 39-42 is similar to flash drive 340 of FIGS. 35-38 and, therefore, the primary differences between these two flash drives will be the focus of the description.

First, the flash drive 400 has four memory storage groups, each comprising one of the four memory storage components 116,118,124,126. Second, the flash drive 400 lacks any physical control element on the casing 102 for manual manipulation in setting a configuration by which the demux component 112 determines a connection for the interface 110. Instead, the controller 144 is connected via the PCB 104 with the demux component 112, and the demux component 112 receives a control signal from the controller 144 that causes a particular connection with the interface 110 to be made. The control signal that is provided is based on an identification that is received by the controller 144 upon communication with an external device that is using the flash drive 400.

For example, when the interface 110 comprises a USB controller and the flash drive 400 comprises USB connector 106, and the USB controller 106 is plugged into a USB port of the external device, an identification of the external device preferably is received by the controller 144. The identification may identify a type of the external device; a manufacturer of the external device; or both. The identification alternatively or additionally may uniquely identify the external device. The controller 144 is configured to provide a predetermined control signal to the demux component 112 as a function of the identification, and the demux component 112 makes a corresponding connection with a predetermined memory storage group based thereon, whereby a specific mass storage device is provided for use by the external device.

While the interface 110 has been described for use in USB communications, the interface additionally or alternatively may comprise a wireless transmitter and a wireless receiver for wireless communications. A flash drive 460 similar to flash drive 400 but having wireless interface 198 in lieu of the interface 110 is illustrated, as an example, in FIG. 55. The wireless interface 198 of flash drives 460 preferably is configured for WiFi communications, Bluetooth communications, or both types of communications. In such wireless implementations, a mass storage device may or may not be presented. Instead, a network share or network connected drive may be presented. In any case, no more than one memory storage group or mass storage device group is connected with the interface at any given time.

Embodiments of the "Specific Purpose with Override Flash Drives"

Flash drive 405 of FIGS. 43-46 is similar to flash drive 400 but additionally includes an override. In this regard, FIG. 43 is a schematic top view of the flash drive 405; FIG. 44 is a schematic top view of the flash drive 405 in which the outer casing 102 is omitted; FIG. 45 is a schematic bottom view of the flash drive 405; and FIG. 46 is a schematic bottom view of the flash drive 405 in which the outer casing 102 is omitted.

The override of flash drive 405 comprises an arrangement of switch components 267 having switches 265 shown here in the form of toggle switches, each transitionable between "1" and "0". The first toggle switch preferable controls whether the demux component 112 determines the connection to be made with the interface 110 based on an identification that is received from an external device that is using the flash drive 405 or based on a configuration of the arrangement of switch components 267. For example, when the first toggle switch is in the "1" position as seen in FIG. 45, the demux component 112 determines the connection to be made with the interface 110 based on the configuration of the arrangement of switch components 267 and, specifically, the positions of the second and third toggle switches. These two switches provide four different configurations, each corresponding to a connection with a respect one of the four memory storage groups of the flash drive 405.

By providing the override that is manually actuated and set by a user, a user with a personal computing device, for example, may access any of the four mass storage devices of the flash drive 405 for reading, writing, or both as desired. A user thus may save audio files to the specific mass storage device that is automatically provided when the flash drive is connected to an audio device. Thereafter, connection of the flash drive to an audio device will result in the user-saved audio files being played; of course, this presumes that the first toggle switch has been changed back to the "0" position, resulting in the automatic connection by the demux component 112 of the interface 110 with the mass storage device group corresponding to the mass storage device containing the user-saved audio files.

While the interface 110 has been described for use in USB communications, the interface additionally or alternatively may comprise a wireless transmitter and a wireless receiver for wireless communications. A flash drive 470 similar to flash drive 405 but having wireless interface 198 in lieu of the interface 110 is illustrated, as an example, in FIG. 56. The wireless interface 198 of flash drives 470 preferably is configured for WiFi communications, Bluetooth communications, or both types of communications. In such wireless implementations, a mass storage device may or may not be presented. Instead, a network share or network connected drive may be presented. In any case, no more than one memory storage group or mass storage device group is connected with the interface at any given time.

In view of the foregoing, it will be appreciated that one or more of the foregoing disclosed portable memory devices serve to protect to one extent or another user data when sharing the portable memory device by preventing or dissuading access by those to whom the portable memory device is lent. A user need only change the physical configuration of physical control elements of many of the flash drives disclosed herein, such as simply flipping a switch, before passing the portable memory device to someone else for temporary use; the user need not seek out a computer for viewing and deleting any files that might be on the portable memory device.

It further will be appreciated that one or more of the foregoing disclosed portable memory devices serve to facilitate convenience of use when seeking to keep separated certain files, such as work files from personal files. For example, instead of having a "work" portable memory device and a "home" portable memory device, a user can simply have a single, portable memory device in the form of a flash drive apparatus encompassing two mutually exclusive flash drives. In this scenario, the user simply changes the configuration of the physical control element(s) to correspond to the flash-memory drive that is desired at any given time. Such portable memory apparatus thus may be seen by a user as being a "2-in-1 flash drive" apparatus having benefits in a multitude of use cases.

Of course, other benefits and advantages of the foregoing disclosed portable memory devices are provided, too, as will be apparent to the Ordinary Artisan.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A portable memory device, comprising:
   (a) a board for providing electronic communication pathways;
   (b) an interface connected to the board for enabling communications between the portable memory device and an external device;
   (c) a plurality of mass storage device groups connected to the board,
      (i) each mass storage device group comprising,
         (A) a controller, and
         (B) one or more memory storage components including non-volatile memory for reading, writing, and storing of data, and
      (ii) each mass storage device group managing both,
         (A) communications between the portable memory device and the external device through the interface, and
         (B) reading of data from and writing of data to its respective one or more memory storage components; and
   (d) a demux component connected to the board and configured to connect the interface with each mass storage device group of the plurality of mass storage device groups, the connections of the interface with the mass storage device groups being mutually exclusive of each other;
   (e) wherein,
      (i) a first one of the plurality of mass storage device groups provides a first mass storage device when the interface is connected therewith by the demux component, and
      (ii) a second one of the plurality of mass storage device groups provides a second, different mass storage device when the interface is connected therewith by the demux component; and
   (f) wherein a mutually exclusive connection of the interface with one of the mass storage device groups is made based on manual manipulation of one or more physical control elements of the portable memory device.

2. The portable memory device of claim 1, wherein each mass storage device group of the plurality of mass storage device groups comprises an oscillator component that is used therewith when such mass storage device group is connected by the demux component with the interface.

3. The portable memory device of claim 1, further comprising an oscillator component connected to the board, wherein the oscillator component is the only oscillator component of the portable memory device and is used in conjunction with each mass storage device group when such mass storage device group is connected by the demux component with the interface.

4. The portable memory device of claim 1, further comprising an outer casing enclosing the board, and wherein the one or more physical control elements are located on an exterior of the casing.

5. The portable memory device of claim 4, wherein the one or more physical control elements comprise one or more slide switches.

6. The portable memory device of claim 4, wherein the one or more physical control elements comprise one or more thumb wheel switches.

7. The portable memory device of claim 4, wherein the one or more physical control elements comprise one or more toggle switches.

8. A portable memory device for providing mutually exclusive mass storage devices, comprising:
   (a) a board for providing electronic communication pathways;
   (b) an interface connected to the board for enabling communications between the portable memory device and an external device;

(c) a first group of components connected to the board and arranged to provide a first mass storage device when coupled to the interface;

(d) a second group of components connected to the board and arranged to provide a second mass storage device when coupled to the interface; and (e) an arrangement of one or more physical control elements transitionable by hand to,
- (i) a first configuration for effecting coupling of the interface to the first group of components to the exclusion of coupling of the interface to the second group of components, and
- (ii) a second configuration for effecting coupling of the interface to the second group of components to the exclusion of coupling of the interface to the first group of components;

(f) wherein, when the arrangement is in the first configuration, the first group of components are coupled to the interface and provide the first mass storage device for use by the external device; and (g) wherein, when the arrangement is in the second configuration, the second group of components are coupled to the interface and provide the second mass storage device for use by the external device.

9. The portable memory device of claim 8, wherein the arrangement comprises one or more slide switches.

10. The portable memory device of claim 8, wherein the arrangement comprises one or more thumb wheel switches.

11. The portable memory device of claim 8, wherein the arrangement comprises one or more toggle switches.

12. The portable memory device of claim 8, wherein, when the arrangement is transitioned to the first configuration, the interface is physically coupled by such transition to the first group of components; and, when the arrangement is transitioned to the second configuration, the interface is physically coupled by such transition to the second group of components.

13. The portable memory device of claim 8, further comprising a demux component connected to the board and configured to couple the first group of components and the interface when the arrangement is indicated to be in the first configuration, and to couple the second group of components and the interface when the arrangement is indicated to be in the second configuration.

14. The portable memory device of claim 13, wherein, when the arrangement is transitioned to the first configuration, such state is indicated to the demux component; and, when the arrangement is transitioned to the second configuration, such state is indicated to the demux component.

15. The portable memory device of claim 14, wherein the state of the arrangement is indicated by a control signal.

16. The portable memory device of claim 15, wherein the control signal is communicated from the arrangement to the demux component.

17. A portable memory device for providing mutually exclusive mass storage devices, comprising:

(a) a board for providing electronic communication pathways;

(b) an interface connected to the board for enabling communications between the portable memory device and an external device;

(c) a first group of components connected to the board and arranged to provide a first mass storage device when coupled to the interface;

(d) a second group of components connected to the board and arranged to provide a second mass storage device when coupled to the interface; and (e) an arrangement of one or more physical control elements transitionable by hand to different configurations for effecting coupling of the first group of components to the interface to the exclusion of coupling of the second group of components to the interface, and for effecting coupling of the second group of components to the interface to the exclusion of coupling of the first group of components to the interface;

(f) wherein, when the arrangement is in a first configuration, the first group of components are coupled to the interface of the portable memory device and provide the first mass storage device for use by the external device through the interface; and (g) wherein, when the arrangement is not in the first configuration, the second group of components are coupled to the interface of the portable memory device and provide the second mass storage device for use by the external device through the interface.

18. The portable memory device of claim 17, further comprising an outer casing enclosing the board, and wherein the one or more physical control elements comprise one or more slide switches located on an exterior of the casing.

19. The portable memory device of claim 17, further comprising an outer casing enclosing the board, and wherein the one or more physical control elements comprise one or more thumb wheel switches located on an exterior of the casing.

20. The portable memory device of claim 17, further comprising an outer casing enclosing the board, and wherein the one or more physical control elements comprise one or more toggle switches located on an exterior of the casing.

* * * * *